(12) United States Patent
Kamo

(10) Patent No.: US 6,337,776 B1
(45) Date of Patent: Jan. 8, 2002

(54) PRISM OPTICAL SYSTEM AND IMAGE PICKUP APPARATUS USING THE SAME

(75) Inventor: Yuji Kamo, Hino (JP)

(73) Assignee: Olympus Optical Co., Ltd., Tokyo (JP)

( * ) Notice: Subject to any disclaimer, the term of this patent is extended or adjusted under 35 U.S.C. 154(b) by 0 days.

(21) Appl. No.: 09/505,676

(22) Filed: Feb. 17, 2000

(30) Foreign Application Priority Data

Feb. 23, 1999 (JP) .............................................. 11-044344

(51) Int. Cl.[7] .............................. G02B 5/04; G02B 27/14
(52) U.S. Cl. ........................ 359/834; 359/631; 359/633; 359/637
(58) Field of Search .................................. 359/831, 833, 359/834, 837, 633, 720, 631, 637

(56) References Cited

U.S. PATENT DOCUMENTS 6,021,004 A * 2/2000 Sekita et al. ................ 359/676

FOREIGN PATENT DOCUMENTS

| JP | 8-292372 | 11/1996 |
| JP | 9-73043 | 3/1997 |
| JP | 9-197336 | 7/1997 |
| JP | 10-161018 | 6/1998 |

* cited by examiner

Primary Examiner—Cassandra Spyrou
Assistant Examiner—Jared Treas
(74) Attorney, Agent, or Firm—Pillsbury Winthrop LLP

(57) ABSTRACT

The present invention relates to a compact and high-performance prism optical system having, in order in which rays pass from the object side, a first transmitting surface (4), a first reflecting surface (5), a second reflecting surface (6), a third reflecting surface (7), a fourth reflecting surface (8), and a second transmitting surface (9). The first transmitting surface (4) and the second reflecting surface (6) are formed from the identical surface, and the second transmitting surface (9) and the third reflecting surface (7) are formed from the identical surface. The first reflecting surface (5) and the fourth reflecting surface (8) are formed from surfaces independent of the first transmitting surface (4) and the second transmitting surface (9). At least one of the reflecting surfaces is formed from a rotationally asymmetric surface. At least one of the second reflecting surface (6) and the third reflecting surface (7) has a power.

38 Claims, 13 Drawing Sheets

PRISM OPTICAL SYSTEM AND IMAGE PICKUP APPARATUS USING THE SAME

BACKGROUND OF THE INVENTION

The present invention relates to prism optical systems including a reflecting surface that is decentered and has a power, for example, a prism optical system for use in an image-forming optical system, a finder optical system, etc. used in cameras, video cameras and so forth.

Recently, there have been proposed optical systems designed to be compact in size by giving a power to a reflecting surface and folding an optical path in the direction of the optical axis. In such optical systems, a prism or a mirror is mainly used as a member having a reflecting surface with a power. An optical system having a prism and an optical system having a mirror are largely different in characteristics from each other although these optical systems are the same in terms of the structure using a reflecting surface.

When a curvature (radius r of curvature) is given to a reflecting surface of a prism and to a reflecting surface of a mirror, the power of each of the reflecting surfaces is given by the paraxial power calculating equation as follows. The power of the reflecting surface of the prism is $-2n/r$ in a case where the prism is filled therein with a medium having a refractive index n larger than 1, whereas the power of the reflecting surface of the mirror is $-2/r$. Thus, even when these reflecting surfaces have the same curvature, the powers are different from each other. Accordingly, the curvature required for the prism is $1/n$ of the curvature required for the mirror to obtain the same power. Therefore, the prism produces a smaller amount of aberration at the reflecting surface than in the case of the mirror. Thus, the prism is more favorable than the mirror in terms of performance. Moreover, the prism has two refracting surfaces, i.e. an entrance refracting surface and an exit refracting surface, in addition to a reflecting surface as a single member. Therefore, the prism is advantageous from the viewpoint of aberration correction in comparison to the mirror, which has only a reflecting surface as a single member. Furthermore, because the prism is filled with a medium having a refractive index larger than 1, it is possible to obtain a longer optical path length than in the case of the mirror, which is placed in the air. Accordingly, it is relatively easy with the prism to provide the required reflecting surface even when the focal length is short. In general, reflecting surfaces require a high degree of accuracy for assembly because decentration errors of reflecting surfaces cause the performance to be degraded to a considerable extent in comparison to refracting surfaces. In a case where an optical system is constructed by arranging a plurality of reflecting surfaces, the prism is more advantageous than the mirror because the prism enables a plurality of reflecting surfaces to be integrated into one unit so as to fix the relative positions and is therefore capable of preventing performance degradation due to assembling. Thus, the prism is superior to the mirror in many respects.

Meanwhile, when a surface with a power is placed at a tilt to the optical axis, rotationally asymmetric aberrations are produced. For example, if a rotationally asymmetric distortion occurs, a square object may become trapezoidal undesirably. Such rotationally asymmetric aberrations (hereinafter referred to as "decentration aberrations") are impossible to correct by a rotationally symmetric surface in theory. For this reason, rotationally asymmetric curved surfaces, e.g. anamorphic surfaces, are used in conventional prism optical systems.

Such prism optical systems include the disclosure of Japanese Patent Application Unexamined Publication (KOKAI) Number [hereinafter referred to as "JP(A)"] 8-313829. JP(A) 8-313829 discloses an ocular optical system comprising a prism in which there are two reflections, and a first transmitting surface and a second reflecting surface, as counted from the pupil side, are formed from the identical surface. In this optical system, all reflecting surfaces are rotationally asymmetric anamorphic surfaces.

Among the conventional prism optical systems using rotationally asymmetric curved surfaces, prism optical systems in which there are four reflections, in particular, are disclosed in JP(A) 8-292372, 9-73043, 9-197336 and 10-161018.

JP(A) 8-292372 discloses a zoom optical system in which a second reflecting surface and a first transmitting surface, as counted from the object side, are formed from the identical surface, and a third reflecting surface and a second transmitting surface, as counted from the object side, are formed from the identical surface. A first reflecting surface and a fourth reflecting surface are formed independently of the other transmitting surfaces and reflecting surfaces. The first and fourth reflecting surfaces are rotationally asymmetric surfaces, but the second and third reflecting surfaces are plane surfaces, which have no power. The zoom optical system is arranged to form an image once in the prism in order to relay the image.

Example 9 of JP(A) 9-73043 is an ocular optical system formed from a prism in which a first reflecting surface and a third reflecting surfaces, as counted from the pupil side, are formed from the identical surface with a second transmitting surface, and two other reflecting surfaces, i.e. second and fourth reflecting surfaces, are formed independently of the other transmitting surfaces and reflecting surfaces. The first, second and third reflecting surfaces are rotationally asymmetric anamorphic surfaces.

Example 3 of JP(A) 9-197336 is an ocular optical system formed from a prism in which a second reflecting surface and a fourth reflecting surface, as counted from the pupil side, are formed from the identical surface with a first transmitting surface, and a third reflecting surface is formed from the identical surface with a second transmitting surface. Only one reflecting surface, i.e. a first reflecting surface, is formed independently of the other transmitting surfaces and reflecting surfaces. All the reflecting surfaces are rotationally asymmetric anamorphic surfaces.

Example 21 of JP(A) 10-161018 is an optical system formed from a prism in which a second reflecting surface is formed from the identical surface with a first transmitting surface, and a third reflecting surface is formed from the identical surface with a second transmitting surface. Two other reflecting surfaces, i.e. first and fourth reflecting surfaces are formed independently of the other transmitting surfaces and reflecting surfaces. However, no numerical example is shown, and no detailed arrangement is mentioned.

These prior art prism optical systems suffer, however, from various problems as stated below.

In JP(A) 8-313829, because the prism optical system has only two reflecting surfaces, there is a limit in achieving high performance even if the prism reflecting surfaces are formed into rotationally asymmetric surfaces. Therefore, if the aperture becomes large or the field angle becomes large, the optical system may fail to fulfill the required high performance.

Accordingly, it is conceivable to increase the number of reflections so that aberration correction can be made satisfactorily even in the above case. However, high performance cannot always be attained in the prior art prism optical system even if the number of reflections is increased.

In JP(A) 8-292372, there are four reflections. However, there are only two reflecting surfaces having a power. The other two reflecting surfaces are formed from plane surfaces, which have no aberration correcting effects. Accordingly, JP(A) 8-292372 is not substantially different in performance from a prism in which there are two reflections. Moreover, because an image is formed once in the optical path, the powers of the surfaces need to be increased. This results in an increase in the amount of aberration produced. It is difficult to fulfill the required performance satisfactorily unless a large number of reflecting surfaces are used. In addition, because the image is relayed, the optical path length becomes long, and the prism tends to become large in size.

In Example 9 of JP(A) 9-73043, all the reflecting surfaces are given a power. However, the first and third reflecting surfaces are formed from the identical surface with the second transmitting surface. Therefore, the angle of reflection at each of the first and third reflecting surfaces needs to be larger than the total reflection critical angle (critical angle) in order to effect total reflection. In addition, to allow light to be totally reflected at the first and third reflecting surfaces, which are formed from the identical surface, it is necessary to increase the reflection angle at the second reflecting surface, which is placed between the first and third reflecting surfaces. For this reason, despite the arrangement using four reflecting surfaces, it is difficult to effect aberration correction satisfactorily because it is necessary to increase the reflection angles at three of the four reflecting surfaces.

In Example 3 of JP(A) 9-197336 also, the second and fourth reflecting surfaces are formed from the identical surface with the first transmitting surface, and the third reflecting surface is formed from the identical surface with the second transmitting surface. Therefore, there are restrictions on the reflection angles at three of the four reflecting surfaces. Accordingly, it is difficult to effect aberration correction satisfactorily.

In Example 21 of JP(A) 10-161018, the arrangement of an optical system is described, but no consideration is given to the performance aspect. Accordingly, the optical system lacks feasibility.

Thus, all the prior art prism optical systems involve problems in terms of performance in particular. There has heretofore been no compact and high-performance prism optical system that satisfies the demand for an improvement in performance and the demand for a reduction in size at the same time.

SUMMARY OF THE INVENTION

In view of the above-described problems associated with the prior art, an object of the present invention is to provide a compact and high-performance prism optical system.

A prism optical system according to a first aspect of the present invention provided to attain the above-described object has, in order in which light rays pass from the object side, a first transmitting surface, a first reflecting surface, a second reflecting surface, a third reflecting surface, a fourth reflecting surface, and a second transmitting surface. The first transmitting surface and the second reflecting surface are formed from the identical surface, and the second transmitting surface and the third reflecting surface are formed from the identical surface. The first reflecting surface and the fourth reflecting surface are formed from surfaces independent of the first and second transmitting surfaces. At least one of the reflecting surfaces is formed from a rotationally asymmetric surface. At least one of the second and third reflecting surfaces has a power.

A prism optical system according to a second aspect of the present invention provided to attain the above-described object has, in order in which light rays pass from the object side, a first transmitting surface, a first reflecting surface, a second reflecting surface, a third reflecting surface, a fourth reflecting surface, and a second transmitting surface. The first transmitting surface and the second reflecting surface are formed from the identical surface, and the second transmitting surface and the third reflecting surface are formed from the identical surface. The first and fourth reflecting surfaces are formed from surfaces independent of the first and second transmitting surfaces. At least one of the reflecting surfaces is formed from a rotationally asymmetric surface. Light rays from an object form an image only after passing through the second transmitting surface without forming an intermediate image in the prism.

A prism optical system according to a third aspect of the present invention provided to attain the above-described object has, in order in which light rays pass from the object side, a first transmitting surface, a first reflecting surface, a second reflecting surface, a third reflecting surface, a fourth reflecting surface, and a second transmitting surface. The first transmitting surface and the second reflecting surface are formed from the identical surface, and the second transmitting surface and the third reflecting surface are formed from the identical surface. The first and fourth reflecting surfaces are formed from surfaces independent of the first and second transmitting surfaces. At least one of the reflecting surfaces is formed from a rotationally asymmetric surface. Light rays from an object lead a virtual image to the position of an observer's eyeball only after passing through the second transmitting surface without forming an intermediate image in the prism.

First, the reasons for adopting the above-described arrangement in the prism optical system according to the first aspect of the present invention, together with the function thereof, will be described below. As has been stated in regard to the prior art, if a reflecting surface is tilted with respect to the optical axis, rotationally asymmetric decentration aberrations are produced. Therefore, it is desirable that at least one reflecting surface of the surfaces used in the present invention should be a rotationally asymmetric surface. If a rotationally asymmetric surface is used as at least one reflecting surface, it becomes possible to correct the rotationally asymmetric decentration aberrations.

Let us explain the definition of a decentered system.

First, a coordinate system used in the following description and rotationally asymmetric surfaces will be described.

When a light ray from the object center that passes through the center of the stop and reaches the center of the image plane is defined as an axial principal ray, an optical axis defined by a straight line along which the axial principal ray travels until it intersects the first surface of the optical system is defined as a Z-axis. An axis perpendicularly intersecting the Z-axis in the decentration plane of each surface constituting the prism optical system is defined as a Y-axis. An axis perpendicularly intersecting the optical axis and also perpendicularly intersecting the Y-axis is defined as an X-axis. In the following description, ray tracing is forward ray tracing in which rays are traced from the object toward the image plane.

The rotationally asymmetric surface used in the present invention should preferably be a plane-symmetry free-form surface having only one plane of symmetry.

Free-form surfaces used in the present invention are defined by the following equation (A).

$$Z = C_2 X + C_3 Y + C_4 X^2 + C_5 XY + C_6 Y^2 + C_7 X^3 +$$
$$C_8 X^2 Y + C_9 XY^2 + C_{10} Y^3 + C_{11} X^4 + C_{12} X^3 Y +$$
$$C_{13} X^2 Y^2 + C_{14} XY^3 + C_{15} Y^4 + C_{16} X^5 + C_{17} X^4 Y +$$
$$C_{18} X^3 Y^2 + C_{19} X^2 Y^3 + C_{20} XY^4 + C_{21} Y^5 + C_{22} X^6 +$$
$$C_{23} X^5 Y + C_{24} X^4 Y^2 + C_{25} X^3 Y^3 + C_{26} X^2 Y^4 +$$
$$C_{27} XY^5 + C_{28} Y^6 + C_{29} X^7 + C_{30} X^6 Y + C_{31} X^5 Y^2 +$$
$$C_{32} X^4 Y^3 + C_{33} X^3 Y^4 + C_{34} X^2 Y^5 + C_{35} XY^6 + C_{36} Y^7$$

(A)

In general, the above-described free-form surface does not have planes of symmetry in both the XZ- and YZ-planes. In the present invention, however, a free-form surface having only one plane of symmetry parallel to the YZ-plane is obtained by making all terms of odd-numbered degrees with respect to X zero. For example, in the above defining equation (A), the coefficients of the terms $C_2$, $C_5$, $C_7$, $C_9$, $C_{12}$, $C_{14}$, $C_{16}$, $C_{18}$, $C_{20}$, $C_{23}$, $C_{25}$, $C_{27}$, $C_{29}$, $C_{31}$, $C_{33}$, $C_{35}$, ... are set equal to zero. By doing so, it is possible to obtain a free-form surface having only one plane of symmetry parallel to the YZ-plane.

A free-form surface having only one plane of symmetry parallel to the XZ-plane is obtained by making all terms of odd-numbered degrees with respect to Y zero. For example, in the above defining equation (A), the coefficients of the terms $C_3$, $C_5$, $C_8$, $C_{10}$, $C_{12}$, $C_{14}$, $C_{17}$, $C_{19}$, $C_{21}$, $C_{23}$, $C_{25}$, $C_{27}$, $C_{30}$, $C_{32}$, $C_{34}$, $C_{36}$, ... are set equal to zero. By doing so, it is possible to obtain a free-form surface having only one plane of symmetry parallel to the XZ-plane.

Furthermore, the direction of decentration is determined in correspondence to either of the directions of the above-described planes of symmetry. For example, with respect to the plane of symmetry parallel to the YZ-plane, the direction of decentration of the optical system is determined to be the Y-axis direction. With respect to the plane of symmetry parallel to the XZ-plane, the direction of decentration of the optical system is determined to be the X-axis direction. By doing so, rotationally asymmetric aberrations due to decentration can be corrected effectively, and at the same time, productivity can be improved.

It should be noted that the above defining equation (A) is shown as merely an example, and that the feature of the present invention resides in that rotationally asymmetric aberrations due to decentration are corrected and, at the same time, productivity is improved by using a rotationally asymmetric surface having only one plane of symmetry. Therefore, the same advantageous effect can be obtained for any other defining equation that expresses such a rotationally asymmetric surface.

It becomes possible to correct decentration aberrations by using such a rotationally asymmetric surface. However, if the number of aberration correcting surfaces is small, the increase in performance is limited even if rotationally asymmetric surfaces are used. Therefore, increasing the number of reflecting surfaces of the prism optical system is deemed favorable from the viewpoint of performance. However, if the number of reflecting surfaces is increased by using a plurality of prisms, performance degradation is likely to occur owing to decentration errors of the prisms during assembly. Therefore, it is preferable to increase the number of reflecting surfaces of a single prism, in which the relative positions between the surfaces can be fixed.

Increasing the number of reflecting surfaces of a prism is favorable for performance but may cause the prism to become unfavorably large in size. An optical path cannot freely be folded by using reflecting surfaces. It is generally necessary to fold an optical path so that the effective portions of reflecting surfaces do not overlap each other. For example, when there are a surface a, a surface b, and a surface c in order in which light rays travel, if the angle of reflection at the surface b is excessively small, the effective portions of the surfaces a and c undesirably overlap each other. Therefore, it is necessary to increase the reflection angle at the surface b or to increase the spacing between the surfaces a and b and the spacing between the surfaces b and c so that the effective portions of these surfaces do not overlap each other. Accordingly, as the number of reflecting surfaces increases, the number of restrictions on the direction of reflection and the spacing between reflecting surface increases, and it becomes likely to be difficult to achieve a reduction in size of the prism. Thus, simply increasing the number of reflecting surfaces of the prism is favorable for performance but does not allow achievement of a reduction in size.

Under the above-described circumstances, there has been proposed a method of reducing the size of a prism, in which a transmitting surface and a reflecting surface are formed from the identical surface by using total reflection (such a reflecting surface will hereinafter be referred to as "a mutual reflecting surface"; a reflecting surface that is not formed from the identical surface with a transmitting surface will hereinafter be called "an independent reflecting surface"). In this method, a single surface is arranged to refract light when it is transmitted and to totally reflect light when it is reflected, thereby allowing one and the same surface to function as both transmitting and reflecting surfaces. With this arrangement, the effective portions of the reflecting and transmitting surfaces are permitted to overlap each other. Accordingly, the restrictions on the reflection direction and the reflecting surface separation are relaxed, and the prism is unlikely to become large in size even if the number of reflecting surfaces is increased. Thus, it is possible to expect a reduction in size of the prism.

However, it is known that the amount of decentration aberrations produced by a reflecting surface generally increases as the reflection angle at the surface becomes larger. For this reason, if a strong power is given to a mutual reflecting surface, which has a reflection angle larger than the total reflection critical angle, the amount of decentration aberrations produced by the mutual reflecting surface increases unfavorably. Accordingly, a very strong power cannot be given to the mutual reflecting surface, and satisfactory aberration correction cannot be effected. Therefore, the use of a mutual reflecting surface allows a reduction in size but may make it impossible to effect satisfactory aberration correction and hence impossible to attain high performance.

Thus, it has heretofore been difficult in a prism optical system to satisfy the demand for an improvement in performance and the demand for a reduction in size at the same time. Accordingly, the present invention proposes a structure of a compact and high-performance prism optical system attained by optimizing the number of reflections and the arrangement of mutual reflecting surfaces.

As has been stated above, it is important in order to achieve a reduction in size to arrange mutual reflecting surfaces appropriately and also important in order to achieve high performance to increase the number of independent reflecting surfaces used, which allow the reflection angle to be reduced.

It is also important in order to attain a reduction in size to take into consideration the exit direction from the prism optical system. If the exit direction from the prism is set perpendicular or nearly perpendicular to the entrance direction to the prism, it becomes virtually impossible to make the thickness of the optical system smaller than the image height in a case where it is an image-forming optical system. In the case of an ocular optical system, it becomes virtually impossible to make the thickness of the optical system smaller than the height of an intermediate image of a display device or an objective optical system. Accordingly, it is preferable to set the exit direction of the prism parallel or nearly parallel (hereinafter referred to as "approximately parallel") to the entrance direction to the prism. It should be noted that when the exit direction is set approximately parallel to the entrance direction, there are two possible cases, i.e. one in which the direction of travel of emergent rays is the same as the entrance direction, and another in which the travel direction is opposite to the entrance direction. In a case where the travel direction is opposite to the entrance direction, the exit direction is a returning direction with respect to the entrance direction. Therefore, it is necessary to design the optical system so that the effective portions of the first transmitting surface (entrance surface) and the second transmitting surface (exit surface) will not overlap each other. If another member is placed in the vicinity of the exit surface, incident rays may be vignetted. Therefore, it is not preferable to set the travel direction of emergent rays opposite to the entrance direction. Accordingly, it is preferable to arrange the optical system so that the exit direction is the same as the entrance direction.

Therefore, the prism optical system according to the first aspect of the present invention is formed from at least four reflecting surfaces. A first reflecting surface and a fourth reflecting surface are independent reflecting surfaces, and a second reflecting surface and a third reflecting surface are mutual reflecting surfaces. By using independent reflecting surfaces for two of the four reflecting surfaces, it becomes possible to effect satisfactory aberration correction. Further, the second reflecting surface is formed from the identical surface with the first transmitting surface, and the third reflecting surface is formed from the identical surface with the second transmitting surface. With this arrangement, the prism can be effectively reduced in size. Moreover, it becomes easy to set the exit direction of the prism optical system approximately parallel to the entrance direction.

In this case, it is necessary to totally reflect rays at each of the second and third reflecting surfaces. Therefore, it is preferable from the viewpoint of performance to ensure the required power for the prism optical system by giving a power to each of the first and fourth reflecting surfaces, which allow the reflection angle to be made relatively small.

However, because the first and fourth reflecting surfaces are away from each other in terms of the optical path, the ray height in the center of the image field and that at the periphery of the image field differ from each other to a considerable extent. Therefore, if power is given to only the two surfaces, aberrations cannot satisfactorily be corrected because of the difference in ray height. Thus, it is not preferable to give power to only the first and fourth reflecting surfaces.

Therefore, it is necessary in the prism optical system according to the first aspect of the present invention to impart an aberration correcting function, that is, a power, to at least one of the second and third reflecting surfaces, which are placed between the first and fourth reflecting surfaces. With this arrangement, various aberrations can be corrected with good balance. Therefore, it becomes possible to effect aberration correction favorably throughout the image field, from the center to the periphery thereof. Furthermore, it is preferable that at least one of the second and third reflecting surfaces should be formed from a rotationally asymmetric surface.

Accordingly, it is preferable to arrange the prism optical system according to the first aspect of the present invention as follows. The prism optical system comprises at least four reflecting surfaces. When surfaces constituting the prism optical system are defined, in order in which light rays pass from the object side, as a first transmitting surface, a first reflecting surface, a second reflecting surface, a third reflecting surface, a fourth reflecting surface, and a second transmitting surface, the first transmitting surface and the second reflecting surface are formed from the identical surface, and the second transmitting surface and the third reflecting surface are formed from the identical surface. The first reflecting surface and the fourth reflecting surface are formed from surfaces independent of the two transmitting surfaces. Furthermore, a power is given to at least one of the second and third reflecting surfaces. With this arrangement, it becomes possible to obtain a prism optical system that exhibits high performance with a structure smaller in size than the conventional structure.

Next, the prism optical systems according to the second and third aspects of the present invention will be described.

As has been stated with regard to the prism optical system according to the first aspect of the present invention, it is possible to attain a reduction in size and an improvement in performance at the same time by using a rotationally asymmetric surface for a reflecting surface and appropriately arranging reflecting surfaces.

Among optical systems are relay optical systems of the type in which light rays from an object form an image once in the optical path, and the image thus formed is relayed to form a final image. Because it forms an intermediate image, this type of relay optical system generally needs a group of optical elements having strong powers in comparison to an optical system in which an image is not relayed. Therefore, to construct a relay optical system in the prism optical system, the power of each individual surface needs to be increased. If the power of each surface is increased, it may become impossible to correct decentration aberrations satisfactorily even if a rotationally asymmetric surface is used. Therefore, the use of the relay optical system is disadvantageous in terms of performance. In addition, the degree of performance degradation due to surface accuracy errors and decentration accuracy errors increases unfavorably. On the other hand, the relay optical system tends to increase in optical path because it forms an image once in the optical path and relays it. Therefore, if the relay optical system is applied to the prism optical system, the prism becomes undesirably large in size. Thus, the use of the relay optical system, which forms an intermediate image, in the prism optical system is disadvantageous in terms of both performance and size.

In view of these matters, therefore, it is preferable not to form an intermediate image in the prism of the prism optical system according to the present invention. That is, the prism optical system according to the second aspect of the present invention should preferably be arranged so that light rays from an object form an image once only after passing through the second transmitting surface. The prism optical system according to the third aspect of the present invention should preferably be arranged so that light rays from an object are led to the position of an observer's eyeball only after passing through the second transmitting surface without forming an intermediate image in the prism. It is also preferable that the prism optical system according to the second aspect of the present invention should mainly be used in an image-forming optical system, and the prism optical system according to the third aspect of the present invention should mainly be used in a viewing optical system. It should be noted, however, that when the prism optical system according to the present invention is used in an ocular optical system of a real-image finder, an intermediate image formed by an objective optical system is an object plane of a viewing optical system. With this arrangement, the power of each individual surface need not be made strong. Therefore, the arrangement is advantageous in terms of performance and also allows the prism to be reduced in size.

It is desirable in the prism optical systems according to the second and third aspects of the present invention to impart an aberration correcting function, that is, a power, to at least one of the second and third reflecting surfaces, which are placed between the first and fourth reflecting surfaces. Further, it is preferable that at least one of the second and third reflecting surfaces should be formed from a rotationally asymmetric surface.

Next, the arrangements of the prism optical systems according to the first, second and third aspects of the present invention that can effectively attain the object of the present invention will be described. First, the arrangements of the second and third reflecting surfaces will be described.

It has already been stated that it is necessary to impart an aberration correcting function to either one of the second and third reflecting surfaces of the above-described prism optical systems. Because both the second and third reflecting surfaces totally reflect rays, if either of the reflecting surfaces is given such a large power as required to ensure the power of the prism optical system, the amount of decentration aberrations becomes excessively large, and it becomes impossible to attain high performance. Therefore, it is preferable to give either one of the second and third reflecting surfaces the function of correcting decentration aberrations left uncorrected at the first and fourth reflecting surfaces. Accordingly, it is desirable to form either of the second and third reflecting surfaces from a rotationally asymmetric surface and to arrange the rotationally asymmetric surface so that the curvature thereof in at least either one of X- and Y-axis directions changes from a positive to a negative. This arrangement allows asymmetric aberrations to be corrected favorably.

It is desirable that the curvature in the Y-axis direction of the rotationally asymmetric surface, which changes from a positive to a negative, should satisfy the following condition:

$$0.01 < |(CY_{pos}-CY_{neg})/P_Y| < 10 \quad (1)$$

where $CY_{pos}$ is the positive maximum curvature in the Y-axis direction within the effective surface area; $CY_{neg}$ is the negative maximum curvature in the Y-axis direction within the effective surface area; and $P_Y$ is the power in the Y-axis direction of the entire prism optical system.

If $|(CY_{pos}-CY_{neg})/P_Y|$ is not smaller than the upper limit of the condition (1), i.e. 10, asymmetric decentration aberrations are undesirably over-corrected. If $|(CY_{pos}-CY_{neg})/P_Y|$ is not larger than the lower limit, i.e. 0.01, asymmetric decentration aberrations are undesirably under-corrected.

It is preferable to satisfy the following condition:

$$0.05 < |(CY_{pos}-CY_{neg})/P_Y| < 3 \quad (2)$$

It is desirable that the curvature in the Y-axis direction of the rotationally asymmetric surface, which changes from a positive to a negative, should satisfy the following condition:

$$0.01 < |(CX_{pos}-CX_{neg})/P_X| < 10 \quad (3)$$

where $CX_{pos}$ is the positive maximum curvature in the X-axis direction within the effective surface area; $CX_{neg}$ is the negative maximum curvature in the X-axis direction within the effective surface area; and $P_X$ is the power in the X-axis direction of the entire prism optical system.

If $|(CX_{pos}-CX_{neg})/P_X|$ is not smaller than the upper limit of the condition (3), i.e. 10, asymmetric decentration aberrations are undesirably over-corrected. If $|(CX_{pos}-CX_{neg})/P_X|$ is not larger than the lower limit, i.e. 0.01, asymmetric decentration aberrations are undesirably under-corrected.

It is preferable to satisfy the following condition:

$$0.05 < |(CX_{pos}-CX_{neg})/P_X| < 3 \quad (4)$$

It should be noted that both the second and third reflecting surfaces may be formed from surfaces in which the curvature in at least either one of the X- and Y-axis directions changes from a positive to a negative.

Although in the above-described method decentration aberrations are corrected by a reflecting surface in which positive and negative powers are mixed, it is also possible to correct decentration aberrations by distributing powers of different signs, i.e. a positive power and a negative power, to the second and third reflecting surfaces so that the surfaces cancel each other's aberrations with the powers of different signs. With this arrangement in particular, the first and second transmitting surfaces, which are refracting surfaces identical with the second and third reflecting surfaces, can be given powers of different signs. Therefore, the arrangement is favorable from the viewpoint of chromatic aberration correction.

In this case, it is desirable that the curvatures in the Y-axis direction of the second and third reflecting surfaces should satisfy the following condition:

$$0.01 < |(CY_2-CY_3)/P_Y| < 5 \quad (5)$$

where $CY_2$ is the curvature at the maximum power in the Y-axis direction within the effective surface area of the second reflecting surface; $CY_3$ is the curvature at the maximum power in the Y-axis direction within the effective surface area of the third reflecting surface; and $P_Y$ is the power in the Y-axis direction of the entire prism optical system. $CY_2$ and $CY_3$ are the curvatures at points where the powers of the respective surfaces are the maximum. Accordingly, when the power of the reflecting surface is negative, the curvature assumes a negative value. Therefore, in this case, $CY_2 \cdot CY_3 < 0$.

If $|(CY_2-CY_3)/P_Y|$ is not smaller than the upper limit of the condition (5), i.e. 5, asymmetric decentration aberrations are undesirably over-corrected. If $|(CY_2-CY_3)/P_Y|$ is not larger than the lower limit, i.e. 0.01, asymmetric decentration aberrations are undesirably under-corrected.

It is preferable to satisfy the following condition:

$$0.05 < |(CY_2-CY_3)/P_Y| < 2 \quad (6)$$

It is desirable that the curvatures in the X-axis direction of the second and third reflecting surfaces should satisfy the following condition:

$$0.01 < |(CX_2 - CX_3)/P_X| < 5 \quad (7)$$

where $CX_2$ is the curvature at the maximum power in the X-axis direction within the effective surface area of the second reflecting surface; $CX_3$ is the curvature at the maximum power in the X-axis direction within the effective surface area of the third reflecting surface; and $P_X$ is the power in the X-axis direction of the entire prism optical system. It should be noted that $CX_2 \cdot CX_3 < 0$.

If $|(CX_2-CX_3)/P_X|$ is not smaller than the upper limit of the condition (7), i.e. 5, asymmetric decentration aberrations are undesirably over-corrected. If $|(CX_2-CX_3)/P_X|$ is not larger than the lower limit, i.e. 0.01, asymmetric decentration aberrations are undesirably under-corrected.

It is preferable to satisfy the following condition:

$$0.05 < |(CX_2 - CX_3)/P_X| < 2 \quad (8)$$

Next, the arrangements of the first and fourth reflecting surfaces will be described. From the structural point of view of the prism, the first and fourth reflecting surfaces are not restricted in terms of reflection angle. That is, the first and fourth reflecting surfaces need not satisfy the condition for total reflection. Therefore, the amount of decentration aberrations produced by the first and fourth reflecting surfaces can be reduced by setting relatively small reflection angles for these surfaces. If the reflection angle at the first reflecting surface is excessively small, it becomes impossible to effect total reflection of rays at the second reflecting surface, which is a surface subsequent to the first reflecting surface. Accordingly, it is desirable that the reflection angle at the first reflecting surface should satisfy the following condition:

$$10° < |\phi_1| < 45° \quad (9)$$

where $\phi_1$ is the reflection angle at the first reflecting surface for the axial principal ray.

If $|\phi_1|$ is not smaller than the upper limit of the condition (9), i.e. 45°, the amount of decentration aberrations produced by this surface becomes unfavorably large, causing the performance to be degraded. If $|\phi_1|$ is not larger than the lower limit, i.e. 10°, it becomes impossible to effect total reflection of rays at the second reflecting surface.

It is preferable to satisfy the following condition:

$$15° < |\phi_1| < 35° \quad (10)$$

Similarly, because rays are totally reflected at the third reflecting surface, if the reflection angle at the fourth reflecting surface is excessively small, it becomes impossible for rays to pass through the second transmitting surface, which is formed from the identical surface with the third reflecting surface. Therefore, it is desirable that the reflection angle at the fourth reflecting surface should satisfy the following condition:

$$10° < |\phi_4| < 45° \quad (11)$$

where $\phi_4$ is the reflection angle at the fourth reflecting surface for the axial principal ray.

If $|\phi_4|$ is not smaller than the upper limit of the condition (11), i.e. 45°, the amount of decentration aberrations produced by this surface becomes unfavorably large, causing the performance to be degraded. If $|\phi_4|$ is not larger than the lower limit, i.e. 10°, it becomes impossible to effect total reflection of rays at the third reflecting surface.

It is preferable to satisfy the following condition:

$$15° < |\phi_4| < 35° \quad (12)$$

It has already been stated that it is preferable in the prism optical system according to the present invention to give a strong power to each of the first and fourth reflecting surfaces from the viewpoint of ensuring the power required for the prism. Therefore, it is necessary to set the power of the first reflecting surface appropriately to control the amount of decentration aberrations produced by this surface. Accordingly, it is desirable that the curvature in the Y-axis direction of the first reflecting surface should satisfy the following condition:

$$0.01 < |CY_1/P_Y| < 2 \quad (13)$$

where $CY_1$ is the curvature at the maximum power in the Y-axis direction within the effective surface area of the first reflecting surface, and $P_Y$ is the power in the Y-axis direction of the entire prism optical system.

If $|CY_1/P_Y|$ is not smaller than the upper limit of the condition (13), i.e. 2, the power of the first reflecting surface becomes excessively strong, and the amount of decentration aberrations produced by this surface becomes unfavorably large. If $|CY_1/P_Y|$ is not larger than the lower limit, i.e. 0.01, the power of the first reflecting surface becomes excessively weak, and it becomes impossible to correct decentration aberrations.

It is preferable to satisfy the following condition:

$$0.1 < |CY_1/P_Y| < 0.8 \quad (14)$$

Similarly, it is desirable that the curvature in the X-axis direction of the first reflecting surface should satisfy the following condition:

$$0.01 < |CX_1/P_X| < 2 \quad (15)$$

where $CX_1$ is the curvature at the maximum power in the X-axis direction within the effective surface area of the first reflecting surface, and $P_X$ is the power in the X-axis direction of the entire prism optical system.

If $|CX_1/P_X|$ is not smaller than the upper limit of the condition (15), i.e. 2, the power of the first reflecting surface becomes excessively strong, and the amount of decentration aberrations produced by this surface becomes unfavorably large. If $|CX_1/P_X|$ is not larger than the lower limit, i.e. 0.01, the power of the first reflecting surface becomes excessively weak, and it becomes impossible to correct decentration aberrations.

It is preferable to satisfy the following condition:

$$0.01 < |CX_1/P_X| < 1 \quad (16)$$

Similarly, it is necessary to set the power of the fourth reflecting surface appropriately. Accordingly, it is desirable that the curvature in the Y-axis direction of the fourth reflecting surface should satisfy the following condition:

$$0.01 < |CY_4/P_Y| < 2 \quad (17)$$

where $CY_4$ is the curvature at the maximum power in the Y-axis direction within the effective surface area of the fourth reflecting surface, and $P_Y$ is the power in the Y-axis direction of the entire prism optical system.

If $|CY_4/P_Y|$ is not smaller than the upper limit of the condition (17), i.e. 2, the power of the fourth reflecting surface becomes excessively strong, and the amount of decentration aberrations produced by this surface becomes unfavorably large. If $|CY_4/P_Y|$ is not larger than the lower limit, i.e. 0.01, the power of the fourth reflecting surface becomes excessively weak, and it becomes impossible to correct decentration aberrations.

It is preferable to satisfy the following condition:

$$0.1<|CY_4/P_Y|<0.8 \quad (18)$$

Similarly, it is desirable that the curvature in the X-axis direction of the fourth reflecting surface should satisfy the following condition:

$$0.01<|CX_4/P_X|<2 \quad (19)$$

where $CX_4$ is the curvature at the maximum power in the X-axis direction within the effective surface area of the fourth reflecting surface, and $P_X$ is the power in the X-axis direction of the entire prism optical system.

If $|CX_4/P_X|$ is not smaller than the upper limit of the condition (19), i.e. 2, the power of the fourth reflecting surface becomes excessively strong, and the amount of decentration aberrations produced by this surface becomes unfavorably large. If $|CX_4/P_X|$ is not larger than the lower limit, i.e. 0.01, the power of the fourth reflecting surface becomes excessively weak, and it becomes impossible to correct decentration aberrations.

It is preferable to satisfy the following condition:

$$0.1<|CX_4/P_X|<1 \quad (20)$$

It is preferable from the viewpoint of aberration correction to distribute powers of the same sign to the first and fourth reflecting surfaces. If the prism optical system is arranged so that all the surfaces have negative powers, the prism becomes undesirably large in size because the light beam diverges. Accordingly, it is not always possible to attain a reduction in size even if the optical axis is folded by using reflecting surfaces. Therefore, it is preferable to give positive powers to both the first and fourth reflecting surfaces.

It has been stated in the foregoing that setting the optical axis entering the prism optical system and the optical axis exiting therefrom approximately parallel to each other is effective in achieving a reduction in size. It is most desirable that the entering and exiting optical axes should be completely parallel to each other. However, because of the necessity of providing another member, it is not always possible to attain a reduction in size if the entering and exiting optical axes are set completely parallel to each other. Accordingly, it is desirable that the axial principal ray entering the prism optical system and the axial principal ray exiting therefrom should satisfy the following condition:

$$0°\leq \theta<45° \quad (21)$$

where θ is the angle formed between the axial principal ray entering the prism optical system and the axial principal ray exiting therefrom.

If the angle θ is not smaller than the upper limit of the condition (21), i.e. 45°, the thickness of the prism in the direction of the optical axis entering the prism optical system becomes undesirably large, and it becomes impossible to attain a reduction in size.

It is preferable to satisfy the following condition:

$$0°\leq \theta<20° \quad (22)$$

where θ is the angle formed between the axial principal ray entering the prism optical system and the axial principal ray exiting therefrom.

Still other objects and advantages of the invention will in part be obvious and will in part be apparent from the specification.

The invention accordingly comprises the features of construction, combinations of elements, and arrangement of parts which will be exemplified in the construction hereinafter set forth, and the scope of the invention will be indicated in the claims.

DESCRIPTION OF THE PREFERRED EMBODIMENTS

Figure 1:
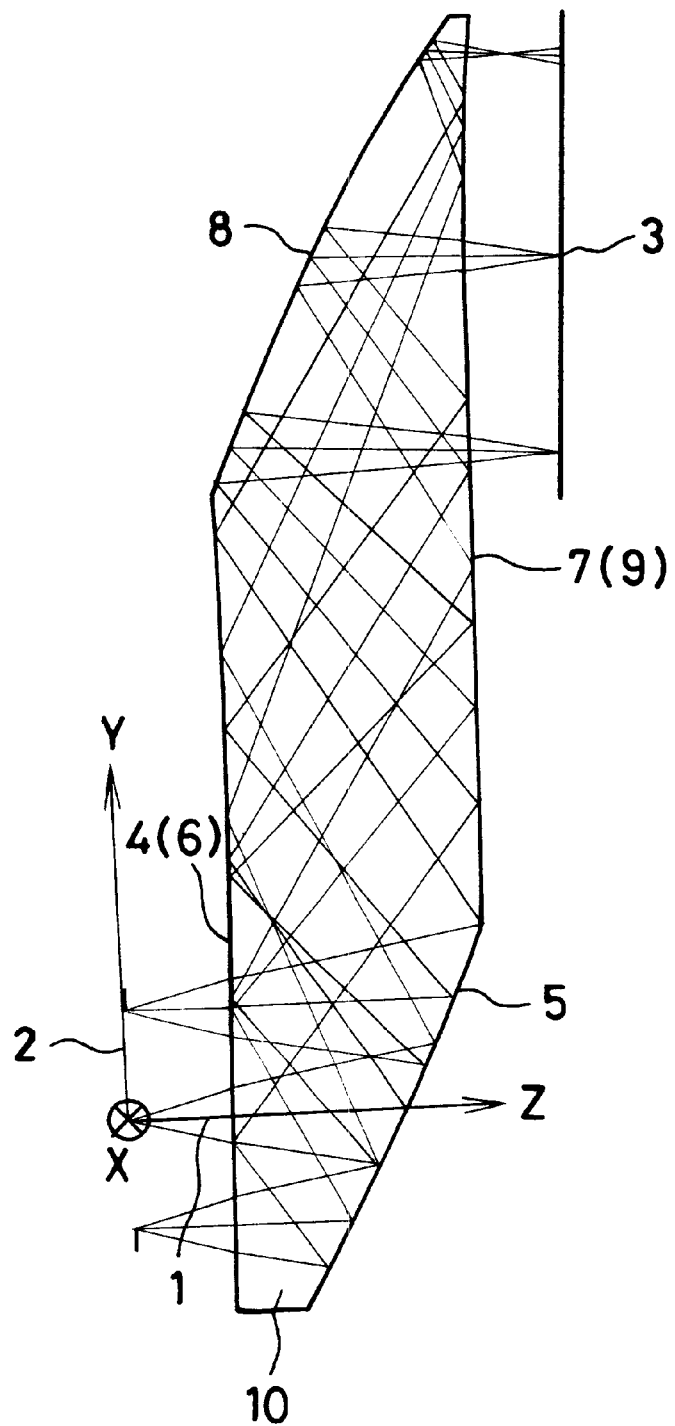
FIG. 1 is a sectional view taken along the YZ-plane, showing a prism optical system according to Example 1 of the present invention.
Figure 2:
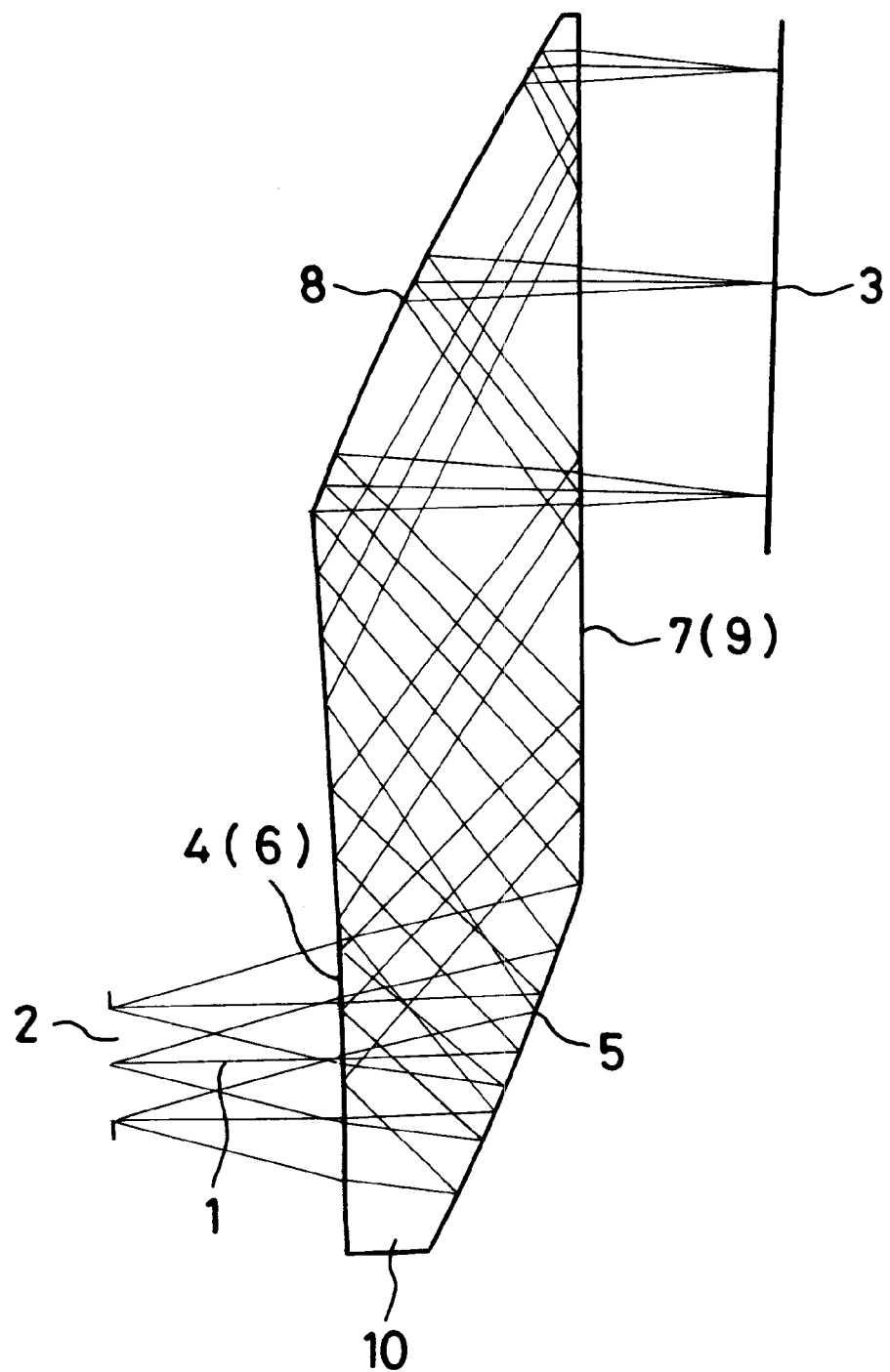
FIG. 2 is a sectional view taken along the YZ-plane, showing a prism optical system according to Example 2 of the present invention.
Figure 3:
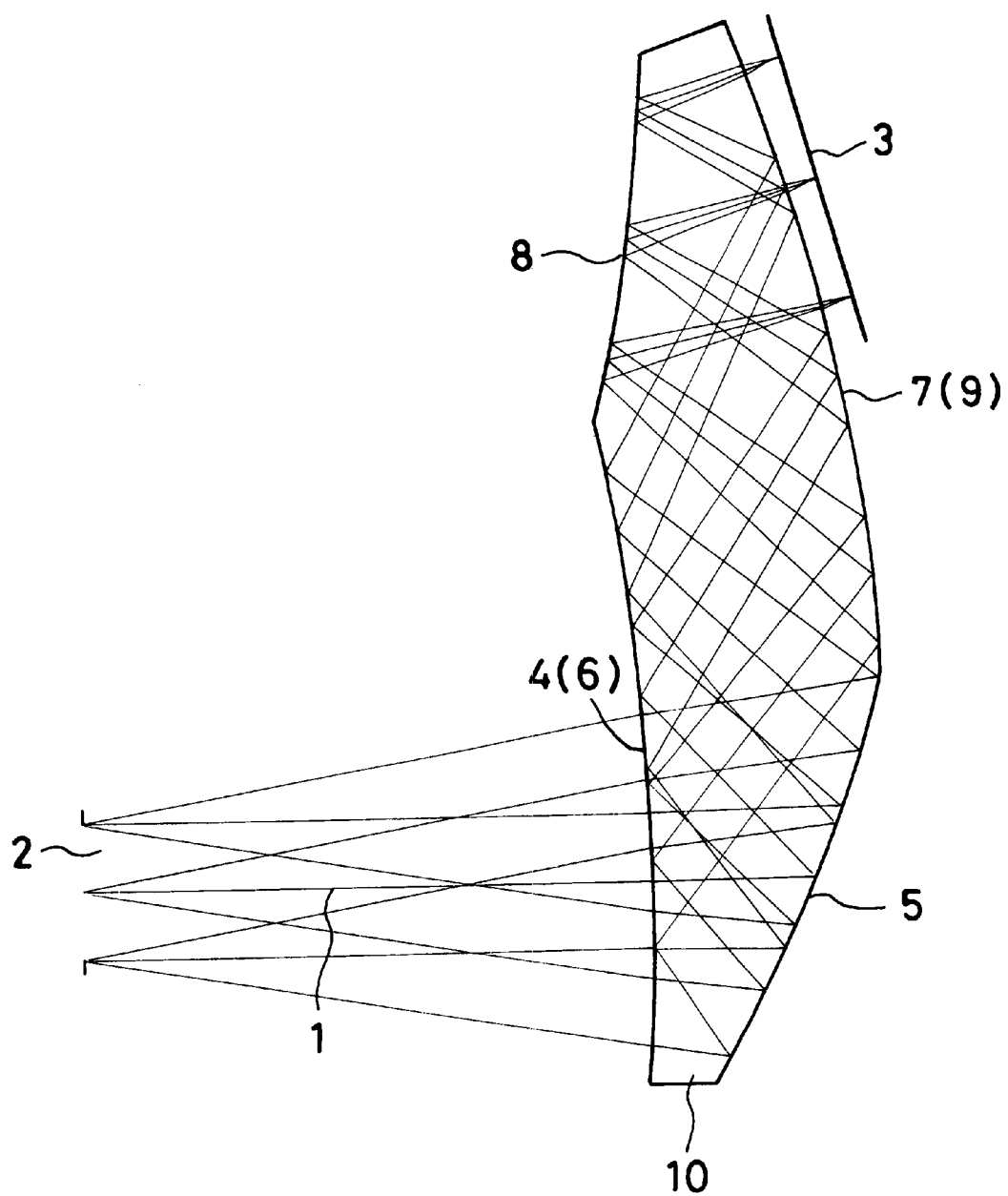
FIG. 3 is a sectional view taken along the YZ-plane, showing a prism optical system according to Example 3 of the present invention.

Numerical Examples 1 to 3 of the image-forming optical system according to the present invention will be described below. It should be noted that constituent parameters of each example will be shown later. In each example, as shown in FIGS. 1 to 3, the center of a stop 2 is defined as the origin of a decentered optical system 10, and an axial principal ray 1 is defined by a ray emanating from the center of an object (not shown in the figures) and passing through the center of the stop 2. A Z-axis is taken in the direction in which the axial principal ray 1 travels from the object center to a first surface 4 of the optical system 10. A plane containing the Z-axis and the center of an image plane 3 is defined as a YZ-plane. A Y-axis is taken in a direction that is in a plane in which rays are folded by the surfaces of the optical system 10 and that perpendicularly intersects the Z-axis in the YZ-plane. The direction in which the Z-axis extends from the object point toward the first surface 4 of the optical system 10 is defined as a positive direction of the Z-axis. The upward direction as viewed in the figures is defined as a positive direction of the Y-axis. An axis that constitutes a right-handed orthogonal coordinate system in combination with the Y- and Z-axes is defined as an X-axis.

In Examples 1 to 3, decentration of each surface is made in the YZ-plane, and one and only plane of symmetry of each rotationally asymmetric free-form surface is the YZ-plane.

Regarding decentered surfaces, each surface is given displacements in the X-, Y- and Z-axis directions (x, y and z, respectively) of the vertex position of the surface from the origin of the optical system 10, and tilt angles (degrees) of the center axis of the surface [the Z-axis of the above equation (A) in regard to free-form surfaces] with respect to the X-, Y- and Z-axes ($\alpha$, $\beta$ and $\gamma$, respectively). In this case, positive $\alpha$ and $\beta$ mean counterclockwise rotation relative to the positive directions of the corresponding axes, and positive $\gamma$ means clockwise rotation relative to the positive direction of the Z-axis.

Among optical surfaces constituting the optical system 10 in each example, a specific surface and a surface subsequent thereto are given a surface separation when these surfaces form a coaxial optical system. In addition, the refractive index and Abbe's number of each medium are given according to the conventional method. The configuration of each free-form surface used in the present invention is defined by the above equation (A). The Z-axis of the defining equation is the axis of the free-form surface.

In the constituent parameters (shown later), those terms concerning free-form surfaces for which no data is shown are zero. The refractive index is expressed by the refractive index for the spectral d-line (wavelength: 587.56 nanometers). Lengths are given in millimeters.

Free-form surfaces may also be defined by Zernike polynomials. That is, the configuration of a free-form isurface may be defined by the following equation (B). The Z-axis of the defining equation (B) is the axis of Zernike polynomial. A rotationally asymmetric surface is defined by polar coordinates of the height of the Z-axis with respect to the XY-plane. In the equation (B), A is the distance from the Z-axis in the XY-plane, and R is the azimuth angle about the Z-axis, which is expressed by the angle of rotation measured from the Z-axis.

$x = R \times \cos(A)$ $y = R \times \sin(A)$ $Z = D_2 + D_3 R \cos(A) + D_4 R \sin(A) + D_5 R^2 \cos(2A) + D_6(R^2 - 1) + D_7 R^2 \sin(2A) + D_8 R^3 \cos(3A) + D_9$ $(3R^3 - 2R) \cos(A) + D_{10}(3R^3 - 2R) \sin(A) + D_{11} R^3 \sin$ $(3A) + D_{12} R^4 \cos(4A) + D_{13}(4R^4 - 3R^2) \cos(2A) + D_{14}(6R^4 - 6R^2 + 1) + D_{15}(4R^4 - 3R^2) \sin(2A) + D_{16}$ $R^4 \sin(4A) + D_{17} R^5 \cos(5A) + D_{18}(5R^5 - 4R^3) \cos(3A) + D_{19}(10R^5 - 12R^3 + 3R) \cos(A) + D_{20}(10R^5 - 12R^3$ $+ 3R) \sin(A) + D_{21}(5R^5 - 4R^3) \sin(3A) + D_{22} R^5 \sin(5A)$ $+ D_{23} R^6 \cos(6A) + D_{24}(6R^6 - 5R^4) \cos(4A) + D_{25}(15R^6 - 20R^4 + 6R^2) \cos(2A) + D_{26}(20R^6 - 30R^4 + 12R^2 - 1)$ $+ D_{27}(15R^6 - 20R^4 + 6R^2) \sin(2A) + D_{28}(6R^6 - 5R^4) \sin(4A) + D_{29} R^6 \sin(6A)$ (B)

In the above equation, to design an optical system symmetric with respect to the X-axis direction, $D_4$, $D_5$, $D_6$, $D_{10}$, $D_{11}$, $D_{12}$, $D_{13}$, $D_{14}$, $D_{20}$, $D_{21}$, $D_{22}$ ... should be used.

Other examples of surfaces usable in the present invention are expressed by the following defining equation (C):

$Z = \Sigma\Sigma C_{nm} XY$

Assuming that k=7 (polynomial of degree 7), for example, a free-form surface is expressed by an expanded form of the above equation as follows:

$$Z = C_2 + C_3 y + C_4|x| + C_5 y^2 + C_6 y|x| + C_7 x^2 + C_8 y^3 + \quad (C)$$
$$C_9 y^2 |x| + C_{10} yx^2 + C_{11}|x^3| + C_{12} y^4 + C_{13} y^3 |x| +$$
$$C_{14} y^2 x^2 + C_{15} y|x^3| + C_{16} x^4 + C_{17} y^5 + C_{18} y^4 |x| +$$
$$C_{19} y^3 x^2 + C_{20} y^2 |x^3| + C_{21} yx^4 + C_{22} |x^5| + C_{23} y^6 +$$
$$C_{24} y^5 |x| + C_{25} y^4 x^2 + C_{26} y^3 |x^3| + C_{27} y^2 x^4 +$$
$$C_{28} y|x^5| + C_{29} x^6 + C_{30} y^7 + C_{31} y^6 |x| + C_{32} y^5 x^2 +$$
$$C_{33} y^4 |x^3| + C_{34} y^3 x^4 + C_{35} y^2 |x^5| + C_{36} yx^6 + C_{37} |x^7|$$

Although in the examples of the present invention the surface configuration is expressed by a free-form surface using the above equation (A), it should be noted that the same advantageous effect can be obtained by using the above equation (B) or (C).

Although the prisms of the optical systems 10 according to Examples 1 to 3 are formed by using a plastic material, it should be noted that the prisms may be made of glass. When a plastic material is used, in particular, it is desirable to use a material of low moisture absorption because performance degradation caused by environmental changes is minimized by the use of such a material.

EXAMPLE 1

FIG. 1 is a sectional view of Example 1 taken along the YZ-plane containing the axial principal ray.

Example 1 is an image-forming optical system, in which photographic field angles are as follows: The horizontal half field angle is 19.28°, and the vertical half field angle is 14.70°. F-number is 2.8. The image height is 2.45×1.84 millimeters (diagonal image height: 3.06 millimeters). In terms of the focal length of a rotationally symmetric optical system, the X-axis direction focal length is equivalent to 7.6 millimeters, and the Y-axis direction focal length is equivalent to 7.1 millimeters.

Constituent parameters of this example will be shown later. In the constituent parameters, free-form surfaces are denoted by "FFS". The same shall apply to the subsequent examples.

Example 1 comprises only one prism 10 of positive power. The prism 10 has, in order in which light passes from the object side, a first transmitting surface 4, a first reflecting surface 5 of positive power, a second reflecting surface 6, a third reflecting surface 7, a fourth reflecting surface 8 of positive power, and a second transmitting surface 9. The first transmitting surface 4 and the second reflecting surface 6 are the identical optical surface having both transmitting and reflecting actions, and the second transmitting surface 9 and the third reflecting surface 7 are the identical optical surface having both transmitting and reflecting actions. In this example, all the first to fourth reflecting surfaces 5 to 8 are decentered free-form surfaces. The second reflecting surface 6, which is formed from the identical surface with the first transmitting surface 4, and the third reflecting surface 7, which is formed from the identical surface with the second transmitting surface 9, are surfaces in which curvatures in both the X- and Y-axis directions change from a positive to a negative.

EXAMPLE 2

FIG. 2 is a sectional view of Example 2 taken along the YZ-plane containing the axial principal ray.

Example 2 is an image-forming optical system, in which photographic field angles are as follows: The horizontal half field angle is 19.28°, and the vertical half field angle is 14.70°. F-number is 7. The image height is 2.45×1.84 millimeters (diagonal image height: 3.06 millimeters). In terms of the focal length of a rotationally symmetric optical system, the X-axis direction focal length is equivalent to 8.4 millimeters, and the Y-axis direction focal length is equivalent to 7.1 millimeters.

Example 2 comprises only one prism 10 of positive power. The prism 10 has, in order in which light passes from the object side, a first transmitting surface 4 of positive power, a first reflecting surface 5 of positive power, a second reflecting surface 6 of positive power, a third reflecting surface 7 that is a plane surface, a fourth reflecting surface 8 of positive power, and a second transmitting surface 9 that is a plane surface. The first transmitting surface 4 and the second reflecting surface 6 are the identical optical surface having both transmitting and reflecting actions, and the second transmitting surface 9 and the third reflecting surface 7 are the identical optical surface having both transmitting and reflecting actions. In this example, the first reflecting surface 5, the second reflecting surface 6 and the fourth reflecting surface 8 are decentered free-form surfaces, and the third reflecting surface 7 is a plane surface. The second reflecting surface 6, which is formed from the identical surface with the first transmitting surface 4, is a surface having positive powers in both the X- and Y-axis directions. The arrangement may be such that the second reflecting surface 6 is a plane surface and the third reflecting surface 7 is a free-form surface in reverse relation to the above. The plane surface may be a rotationally symmetric spherical or aspherical surface.

EXAMPLE 3

FIG. 3 is a sectional view of Example 3 taken along the YZ-plane containing the axial principal ray.

Example 3 is an ocular optical system, in which field angles are as follows: The horizontal half field angle is 6.64°, and the vertical half field angle is 9.55°. The pupil diameter is 4 millimeters. The size of an image display device placed in the image plane 3 or the size of an intermediate image formed by an objective optical system is 2.53×3.66 millimeters (diagonal image height: 4.45 millimeters). In terms of the focal length of a rotationally symmetric optical system, the X-axis direction focal length is equivalent to 21.8 millimeters, and the Y-axis direction focal length is equivalent to 21.9 millimeters.

Example 3 is designed on the basis of backward ray tracing. Therefore, in the ray diagram of FIG. 3 and in the constituent parameters (shown later), rays actually travel from the image plane 3 toward the stop 2. An image display device is placed in the image plane 3. Alternatively, an intermediate image produced by an objective optical system is formed in the image plane 3. An observer's pupil is placed at the position of the stop 2. Therefore, the object point is set at 2000 millimeters on the image side so that a virtual image is formed at $-0.5$ m$^{-1}$ from the pupil plane (the plane of the stop 3) in forward ray tracing.

The following description will be made on the basis of forward ray tracing. The optical system comprises only one prism 10 of positive power. The prism 10 has, in order in which light passes from the object side (i.e. from the image plane 3 in the constituent parameters and in FIG. 3), a first transmitting surface 9 of positive power, a first reflecting surface 8 of negative power, a second reflecting surface 7 of positive power, a third reflecting surface 6 of negative power, a fourth reflecting surface 5 of positive power, and a second transmitting surface 4 of negative power. In this example, all the first to fourth reflecting surfaces 8 to 5 are decentered free-form surfaces.

Constituent parameters in the foregoing Examples 1 to 3 are shown below. In the tables below, "FFS" denotes a free-form surface.

EXAMPLE 1

| Surface No. | Radius of curvature | Surface separation | Displacement and tilt | Refractive index | Abbe's No. |
|---|---|---|---|---|---|
| Object plane | ∞ | ∞ | | | |
| 1 | ∞ (Stop) | | | | |
| 2 | FFS ① | | (1) | 1.5254 | 56.2 |
| 3 | FFS ② | | (2) | 1.5254 | 56.2 |
| 4 | FFS ① | | (1) | 1.5254 | 56.2 |
| 5 | FFS ③ | | (3) | 1.5254 | 56.2 |
| 6 | FFS ④ | | (4) | 1.5254 | 56.2 |
| 7 | FFS ③ | | (3) | | |
| Image plane | ∞ | | (5) | | |

FFS ①

| $C_4$ | $-3.4651 \times 10^{-3}$ | $C_6$ | $-1.7350 \times 10^{-3}$ | $C_8$ | $-5.9634 \times 10^{-3}$ |
| $C_{10}$ | $-1.8205 \times 10^{-4}$ | $C_{11}$ | $-1.2948 \times 10^{-3}$ | $C_{13}$ | $3.7362 \times 10^{-4}$ |
| $C_{15}$ | $4.2138 \times 10^{-5}$ | $C_{17}$ | $2.4638 \times 10^{-5}$ | $C_{19}$ | $-3.4841 \times 10^{-5}$ |
| $C_{21}$ | $-6.1853 \times 10^{-6}$ | | | | |

FFS ②

| $C_4$ | $-2.5528 \times 10^{-2}$ | $C_6$ | $-1.9112 \times 10^{-2}$ | $C_8$ | $-3.2202 \times 10^{-3}$ |
| $C_{10}$ | $-4.0744 \times 10^{-4}$ | $C_{11}$ | $-2.2692 \times 10^{-4}$ | $C_{13}$ | $4.1250 \times 10^{-4}$ |
| $C_{15}$ | $9.0654 \times 10^{-5}$ | $C_{17}$ | $8.3882 \times 10^{-5}$ | $C_{19}$ | $2.3041 \times 10^{-4}$ |
| $C_{21}$ | $-4.5808 \times 10^{-5}$ | | | | |

FFS ③

| $C_4$ | $3.0058 \times 10^{-2}$ | $C_6$ | $3.7741 \times 10^{-3}$ | $C_8$ | $-5.8040 \times 10^{-3}$ |
| $C_{10}$ | $7.7940 \times 10^{-4}$ | $C_{11}$ | $-1.9929 \times 10^{-3}$ | $C_{13}$ | $1.9159 \times 10^{-4}$ |
| $C_{15}$ | $-3.5593 \times 10^{-5}$ | $C_{17}$ | $-3.4503 \times 10^{-6}$ | $C_{19}$ | $-7.0480 \times 10^{-5}$ |
| $C_{21}$ | $-6.9275 \times 10^{-6}$ | | | | |

FFS ④

| $C_4$ | $4.1095 \times 10^{-2}$ | $C_6$ | $2.0052 \times 10^{-2}$ | $C_8$ | $-4.0416 \times 10^{-3}$ |
| $C_{10}$ | $2.5774 \times 10^{-3}$ | $C_{11}$ | $-6.4665 \times 10^{-4}$ | $C_{13}$ | $-8.3257 \times 10^{-4}$ |
| $C_{15}$ | $-1.2630 \times 10^{-5}$ | $C_{17}$ | $2.2427 \times 10^{-5}$ | $C_{19}$ | $-1.2111 \times 10^{-4}$ |
| $C_{21}$ | $-5.6026 \times 10^{-5}$ | | | | |

Displacement and tilt (1)

| X | 0.00 | Y | 1.53 | Z | 1.04 |
| α | −1.35 | β | 0.00 | γ | 0.00 |

Displacement and tilt (2)

| X | 0.00 | Y | −0.05 | Z | 2.66 |
| α | −28.30 | β | 0.00 | γ | 0.00 |

-continued

| | Displacement and tilt (3) | | | | |
|---|---|---|---|---|---|
| X | 0.00 | Y | 6.17 | Z | 3.57 |
| α | −1.25 | β | 0.00 | γ | 0.00 |
| | Displacement and tilt (4) | | | | |
| X | 0.00 | Y | 7.70 | Z | 2.07 |
| α | −28.81 | β | 0.00 | γ | 0.00 |
| | Displacement and tilt (5) | | | | |
| X | 0.00 | Y | 7.73 | Z | 4.53 |
| α | −2.88 | β | 0.00 | γ | 0.00 |

EXAMPLE 2

| Surface No. | Radius of curvature | Surface separation | Displacement and tilt | Refractive index | Abbe's No. |
|---|---|---|---|---|---|
| Object plane | ∞ | ∞ | | | |
| 1 | ∞ (Stop) | | | | |
| 2 | FFS ① | | (1) | 1.5254 | 56.2 |
| 3 | FFS ② | | (2) | 1.5254 | 56.2 |
| 4 | FFS ① | | (1) | 1.5254 | 56.2 |
| 5 | ∞ | | (3) | 1.5254 | 56.2 |
| 6 | FFS ③ | | (4) | 1.5254 | 56.2 |
| 7 | ∞ | | (3) | | |
| Image plane | ∞ | | (5) | | |

FFS ①

$C_4$ −3.5798 × 10⁻² $C_6$ −4.1609 × 10⁻³ $C_8$ −1.9712 × 10⁻³
$C_{10}$ −2.6180 × 10⁻⁴ $C_{11}$ 6.3036 × 10⁻⁴ $C_{13}$ −2.2268 × 10⁻⁴

FFS ②

$C_4$ −4.0460 × 10⁻² $C_6$ −1.9572 × 10⁻² $C_8$ −7.3344 × 10⁻⁴
$C_{10}$ −3.3406 × 10⁻⁴

FFS ③

$C_4$ 1.6074 × 10⁻² $C_6$ 1.5622 × 10⁻² $C_8$ 1.5736 × 10⁻³
$C_{10}$ 3.3474 × 10⁻⁴

| | Displacement and tilt (1) | | | | |
|---|---|---|---|---|---|
| X | 0.00 | Y | 0.15 | Z | 2.12 |
| α | 0.62 | β | 0.00 | γ | 0.00 |
| | Displacement and tilt (2) | | | | |
| X | 0.00 | Y | −2.22 | Z | 2.56 |
| α | −30.29 | β | 0.00 | γ | 0.00 |
| | Displacement and tilt (3) | | | | |
| X | 0.00 | Y | −7.72 | Z | 4.11 |
| α | −1.16 | β | 0.00 | γ | 0.00 |
| | Displacement and tilt (4) | | | | |
| X | 0.00 | Y | 7.12 | Z | 3.17 |
| α | −29.09 | β | 0.00 | γ | 0.00 |
| | Displacement and tilt (5) | | | | |
| X | 0.00 | Y | 6.59 | Z | 6.13 |
| α | −2.81 | β | 0.00 | γ | 0.00 |

EXAMPLE 3

| Surface No. | Radius of curvature | Surface separation | Displacement and tilt | Refractive index | Abbe's No. |
|---|---|---|---|---|---|
| Object plane | ∞ | ∞ | | | |
| 1 | ∞ (Stop) | | | | |
| 2 | FFS ① | | (1) | 1.5254 | 56.2 |
| 3 | FFS ② | | (2) | 1.5254 | 56.2 |
| 4 | FFS ① | | (1) | 1.5254 | 56.2 |
| 5 | FFS ③ | | (3) | 1.5254 | 56.2 |
| 6 | FFS ④ | | (4) | 1.5254 | 56.2 |
| 7 | FFS ③ | | (3) | | |
| Image plane | ∞ | | (5) | | |

FFS ①

$C_4$ −2.0971 × 10⁻² $C_6$ −8.3173 × 10⁻³ $C_8$ −6.6227 × 10⁻⁴
$C_{10}$ 2.5390 × 10⁻⁶ $C_{11}$ −4.5721 × 10⁻⁶ $C_{13}$ −9.1288 × 10⁻⁶

FFS ②

$C_4$ −1.6504 × 10⁻² $C_6$ −1.2502 × 10⁻² $C_8$ −1.6226 × 10⁻⁴
$C_{10}$ 1.6433 × 10⁻⁵

FFS ③

$C_4$ −1.5165 × 10⁻² $C_6$ −8.4339 × 10⁻³ $C_8$ −3.2204 × 10⁻⁴
$C_{10}$ 2.7407 × 10⁻⁵ $C_{11}$ −1.6973 × 10⁻⁸ $C_{13}$ −5.1323 × 10⁻⁶

FFS ④

$C_4$ −1.1562 × 10⁻² $C_6$ −1.0027 × 10⁻² $C_8$ −3.7769 × 10⁻⁴
$C_{10}$ 2.0724 × 10⁻⁴

| | Displacement and tilt (1) | | | | |
|---|---|---|---|---|---|
| X | 0.00 | Y | 5.40 | Z | 17.03 |
| α | 5.16 | β | 0.00 | γ | 0.00 |
| | Displacement and tilt (2) | | | | |
| X | 0.00 | Y | 0.00 | Z | 22.15 |
| α | −23.25 | β | 0.00 | γ | 0.00 |
| | Displacement and tilt (3) | | | | |
| X | 0.00 | Y | 14.66 | Z | 23.08 |
| α | 11.67 | β | 0.00 | γ | 0.00 |
| | Displacement and tilt (4) | | | | |
| X | 0.00 | Y | 18.76 | Z | 16.88 |
| α | −8.49 | β | 0.00 | γ | 0.00 |
| | Displacement and tilt (5) | | | | |
| X | 0.00 | Y | 20.44 | Z | 22.57 |
| α | 16.22 | β | 0.00 | γ | 0.00 |

Figure 4:
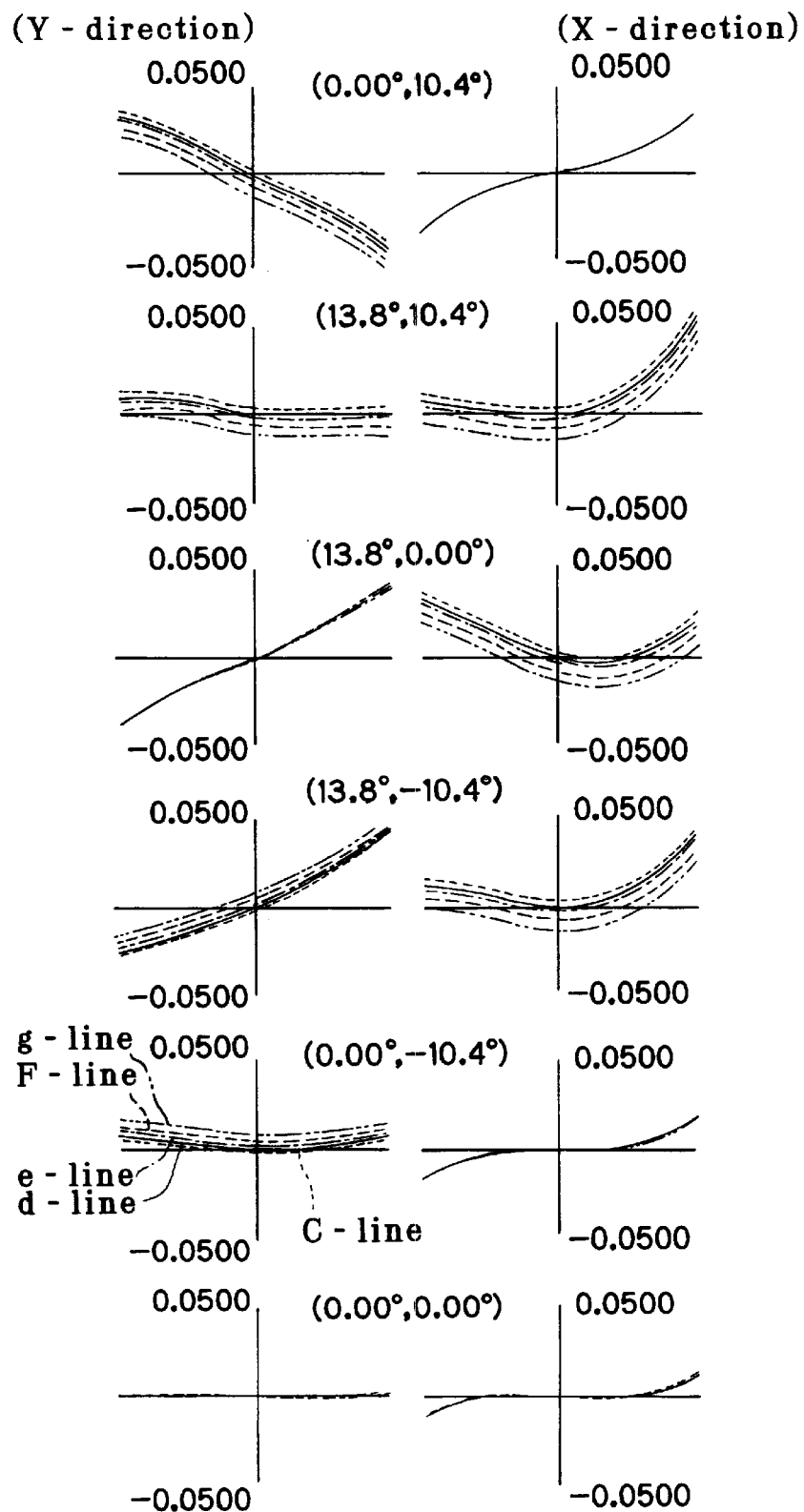
FIG. 4 is an aberrational diagram showing lateral aberrations in the prism optical system according to Example 1.
Figure 5:
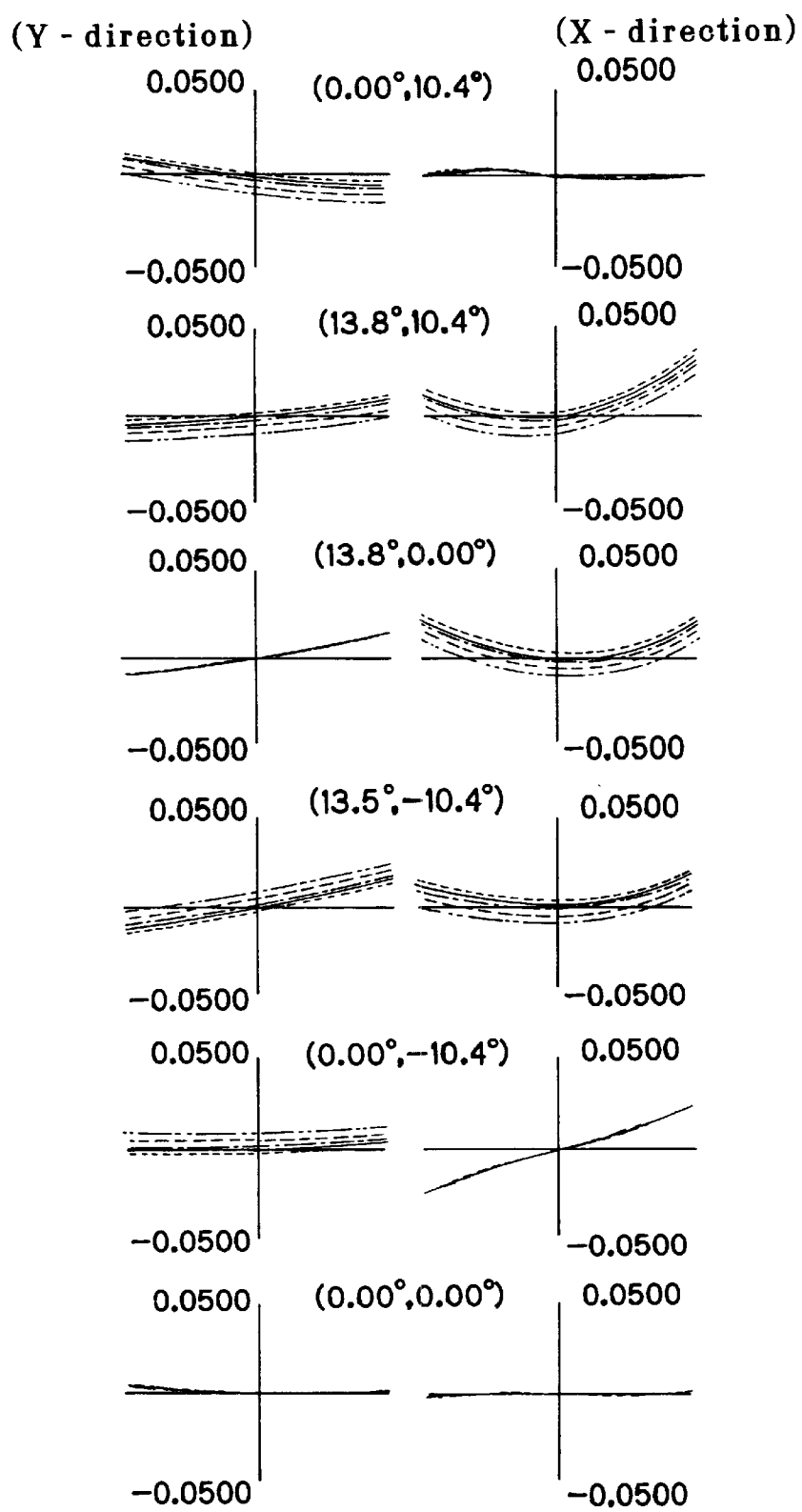
FIG. 5 is an aberrational diagram showing lateral aberrations in the prism optical system according to Example 2.
Figure 6:
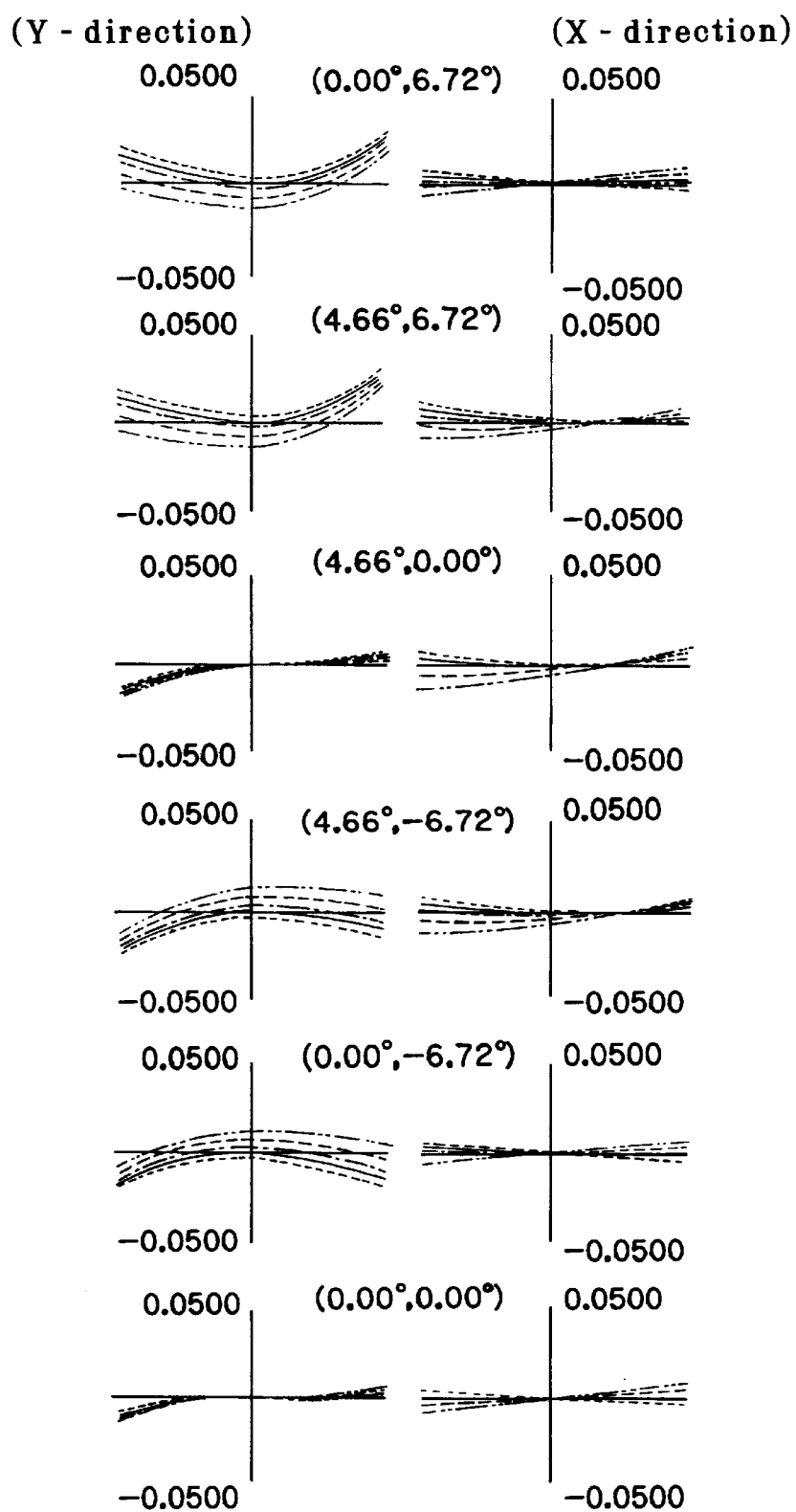
FIG. 6 is an aberrational diagram showing lateral aberrations in the prism optical system according to Example 3.

FIGS. 4 to 6 are aberrational diagrams showing lateral aberrations in the above-described Examples 1 to 3. In the diagrams showing lateral aberrations, the numerals in the parentheses denote [horizontal (X-direction) field angle, vertical (Y-direction) field angle], and lateral aberrations at the field angles are shown. Each aberrational diagram shows, in order from the bottom toward the top of the diagram, lateral aberrations in the center of the image field; lateral aberrations at the position of minus about 70% of the image height on the Y-axis; lateral aberrations at the position of about 70% of the image height in the X-axis direction and minus about 70% of the image height in the Y-axis direction; lateral aberrations at the position of about 70% of the image height on the X-axis; lateral aberrations at the position of about 70% of the image height in the X-axis direction and about 70% of the image height in the Y-axis direction; and lateral aberrations at the position of about 70% of the image height on the Y-axis.

The values concerning the conditions (1) to (22) in the above-described examples are shown below. When there are a plurality of surfaces relevant to a particular condition [conditions (1) and (3)], values are shown in the column from the top in order in which rays pass. When there is no surface relevant to a particular condition, the mark "-" is shown.

| Conditions | Example 1 | Example 2 | Example 3 |
|---|---|---|---|
| (1), (2) | 0.13 | — | — |
|  | 1.80 |  |  |
| (3), (4) | 0.95 | — | — |
|  | 0.16 |  |  |
| (5), (6) | — | — | 0.76 |
| (7), (8) | — | — | 1.92 |
| (9), (10) | 27.7 | 24.5 | 23.3 |
| (11), (12) | 26.6 | 26.1 | 25.0 |
| (13), (14) | 0.32 | 0.32 | 0.55 |
| (15), (16) | 0.46 | 0.71 | 0.76 |
| (17), (18) | 0.42 | 0.26 | 0.55 |
| (19), (20) | 0.71 | 0.34 | 0.57 |
| (21), (22) | 2.9 | 2.8 | 16.2 |

Incidentally, the above-described prism optical system according to the present invention can be used in various image pickup apparatus, e.g. electronic cameras, in which a silver halide film or an electronic image pickup device, e.g. a CCD or a CMOS sensor, is placed in a plane where an object image is formed. Embodiments in which the present invention is applied to such apparatus will be described below.

Figure 7:
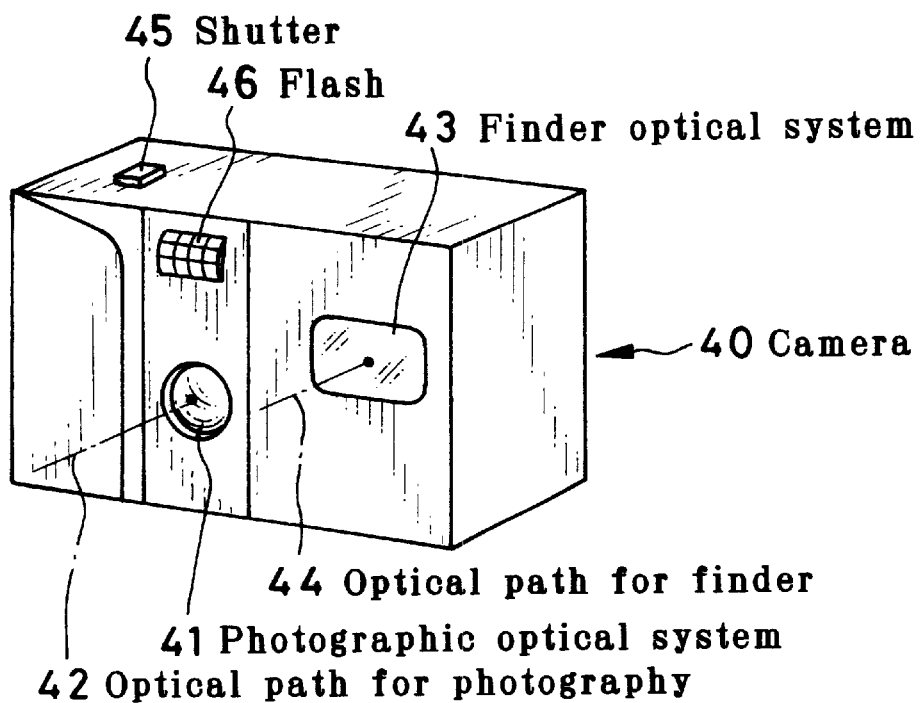
FIG. 7 is a perspective view showing the external appearance of an electronic camera to which a prism optical system according to the present invention is applied, as viewed from the front side thereof.
Figure 8:
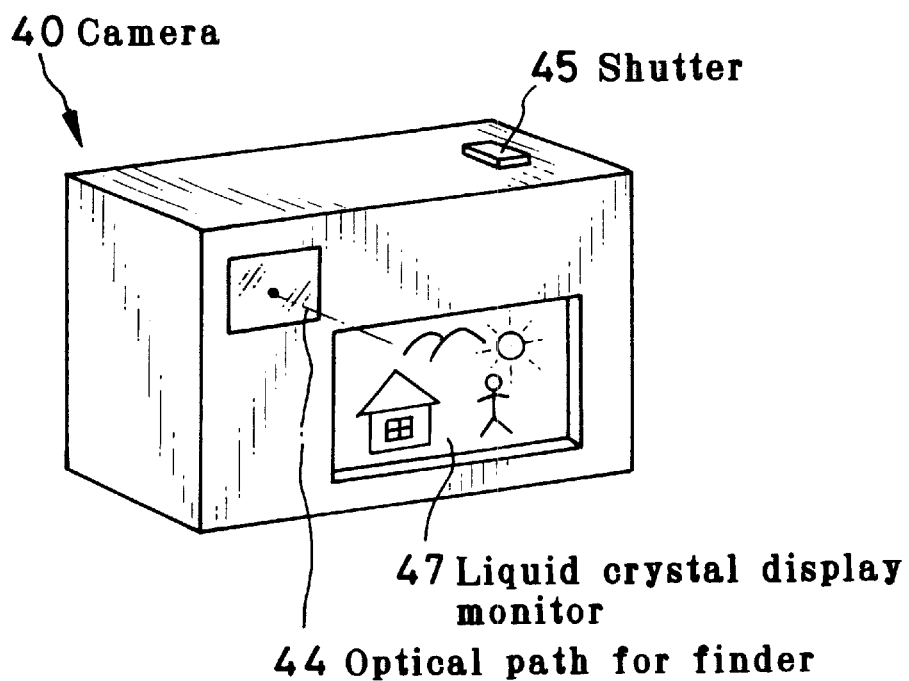
FIG. 8 is a perspective view of the electronic camera shown in FIG. 7, as viewed from the rear side thereof.
Figure 9:
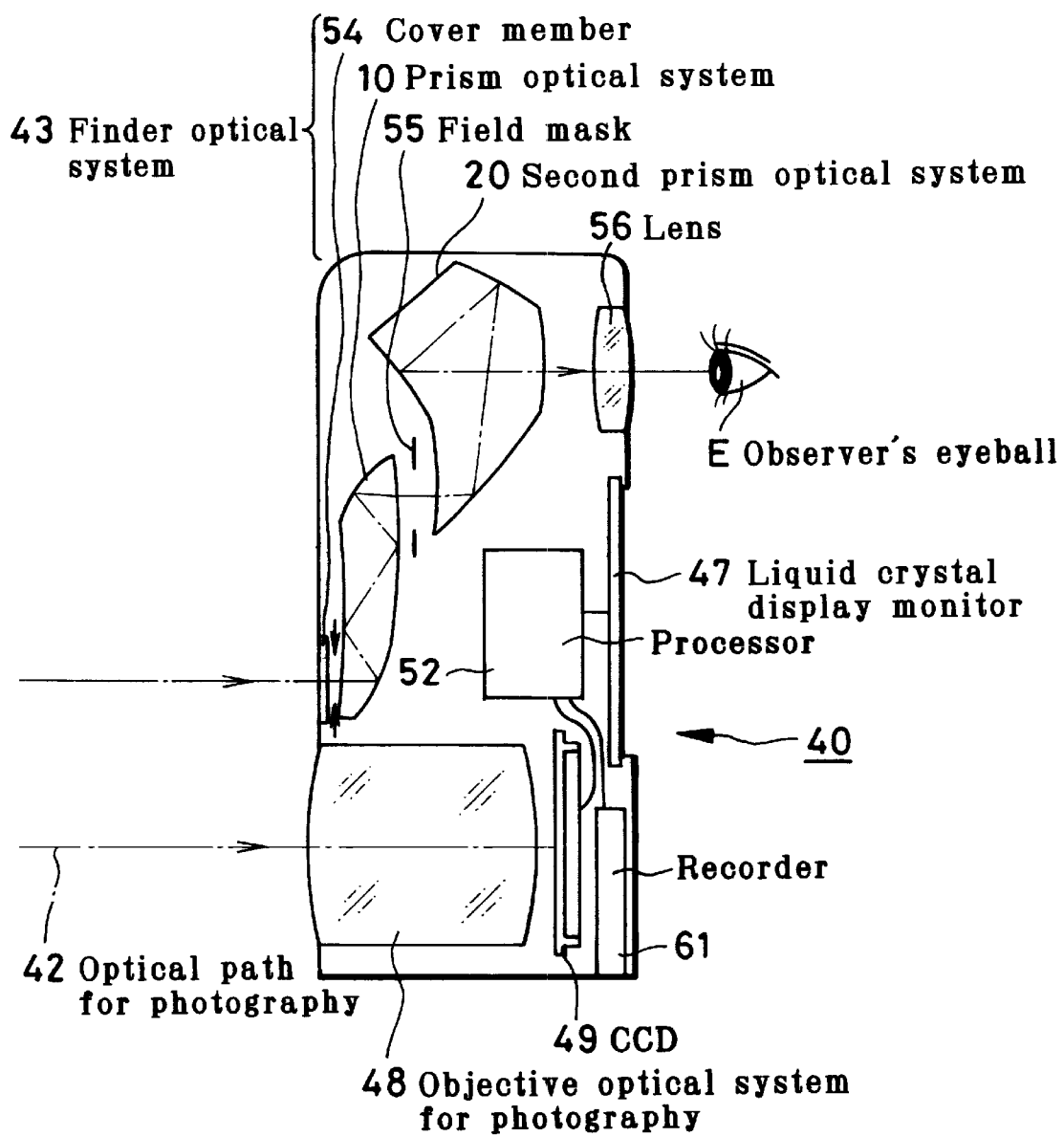
FIG. 9 is a sectional view showing the arrangement of the electronic camera in FIG. 7.

FIGS. 7 to 9 are conceptual views showing an arrangement in which a prism optical system 10 according to the present invention is incorporated into a finder unit of an electronic camera. FIG. 7 is a perspective view showing the external appearance of an electronic camera 40 as viewed from the front side thereof. FIG. 8 is a perspective view of the electronic camera 40 as viewed from the rear side thereof. FIG. 9 is a sectional view showing the arrangement of the electronic camera 40. In the illustrated example, the electronic camera 40 includes a photographic optical system 41 having an optical path 42 for photography, a finder optical system 43 having an optical path 44 for the finder, a shutter 45, a flash 46, a liquid crystal display monitor 47, etc. When the shutter 45, which is placed on the top of the camera 40, is depressed, photography is performed through an objective optical system 48 for photography. An object image produced by the objective optical system 48 for photography is formed on an image pickup surface of a CCD 49. The object image received by the CCD 49 is processed in a processor 52 and displayed as an electronic image on the liquid crystal display monitor 47, which is provided on the rear of the camera 40. A recorder 61 is connected to the processor 52 to enable the photographed electronic image to be recorded. It should be noted that the camera 40 may be arranged in the form of a silver halide camera in which a silver halide film is disposed in place of the CCD 49.

Furthermore, a finder optical system 43 is placed in the optical path 44 for the finder. The finder optical system 43 includes a prism optical system 10 similar to Example 1, for example, as an objective optical system and a field mask 55 placed at the position of the image plane 3 of the prism optical system 10. The finder optical system 43 further includes a second prism optical system 20 constituting an ocular optical system and a lens 56. A subject image can be viewed with an observer's eyeball E. Although in this case a plane-parallel plate is placed as a cover member 54 to constitute a part of the finder optical system 43, a concave lens may be disposed in place of the plane-parallel plate to enlarge the field angle. It should be noted that another type of decentered prism optical system may be used as the second prism optical system 20.

In the camera 40, which is arranged as stated above, the finder optical system 43 can be constructed with a minimal number of optical members. Accordingly, a high-performance and low-cost camera can be realized. Consequently, the degree of freedom with which the constituent elements can be arranged in the camera increases. This is favorable for design.

Although no mention is made of the arrangement of the objective optical system 48 for photography in the electronic camera 40 shown in FIG. 9, it should be noted that the objective optical system 48 for photography may be formed by using not only a refracting coaxial optical system but also a decentered prism image-forming optical system comprising a prism similar to the present invention, as a matter of course.

Next, an example of an image pickup apparatus using a prism optical system according to the present invention as an image-forming optical system.

Figure 10:
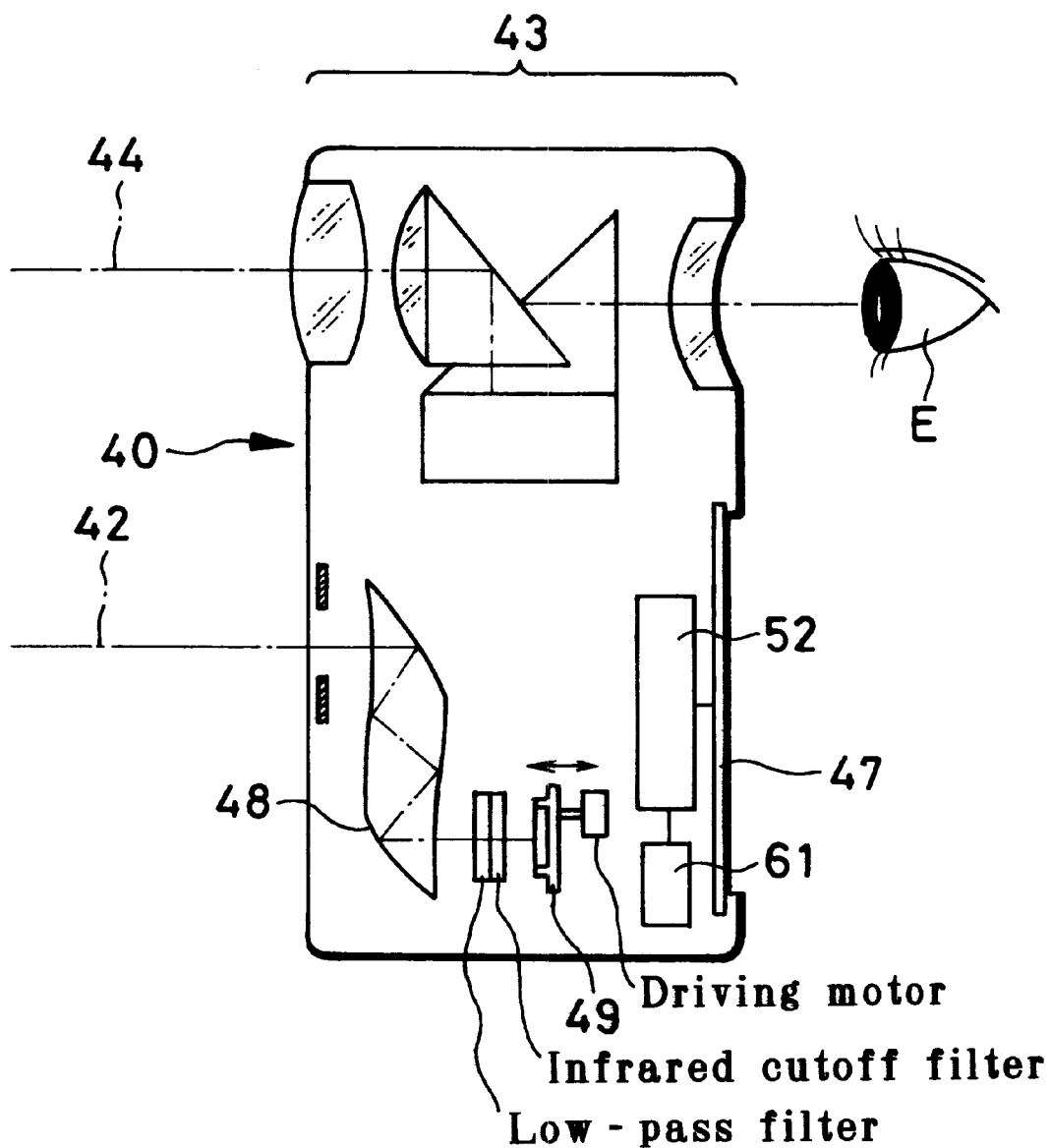
FIG. 10 is a sectional view showing an electronic camera using a prism optical system according to the present invention as an image-forming optical system.

FIG. 10 is a sectional view showing an electronic camera incorporating a prism optical system according to the present invention. It should be noted that the front perspective view showing the external appearance of the electronic camera according to this example and the rear perspective view showing the external appearance thereof are the same as FIGS. 7 and 8. When a shutter 45 placed on the top of the camera 40 is depressed, photography is performed through an objective lens 48 using a prism optical system according to the present invention. An object image produced by the prism optical system 48 is formed on an image pickup chip 49, e.g. a CCD, through an infrared cutoff filter and a low-pass filter.

The object image received by the image pickup chip 49 is inverted through an electrically connected processor 52 and displayed in the form of an erect electronic image on a liquid crystal display monitor 47 provided on the rear of the camera 40.

A finder optical system 43, which has an optical path 44 for the finder, includes an objective optical system for the finder and a Porro prism for erecting an object image formed by the objective optical system for the finder. The finder optical system 43 further includes an ocular lens for leading the object image to an observer's eyeball E.

In the camera 40, the finder optical system 43 may be omitted to reduce the number of parts and to form a compact and low-cost camera. In this case, the observer takes a photograph while viewing the liquid crystal display monitor 47.

In this example, focusing is effected by moving the image pickup chip 49 along the optical axis with a driving motor.

Figure 11:
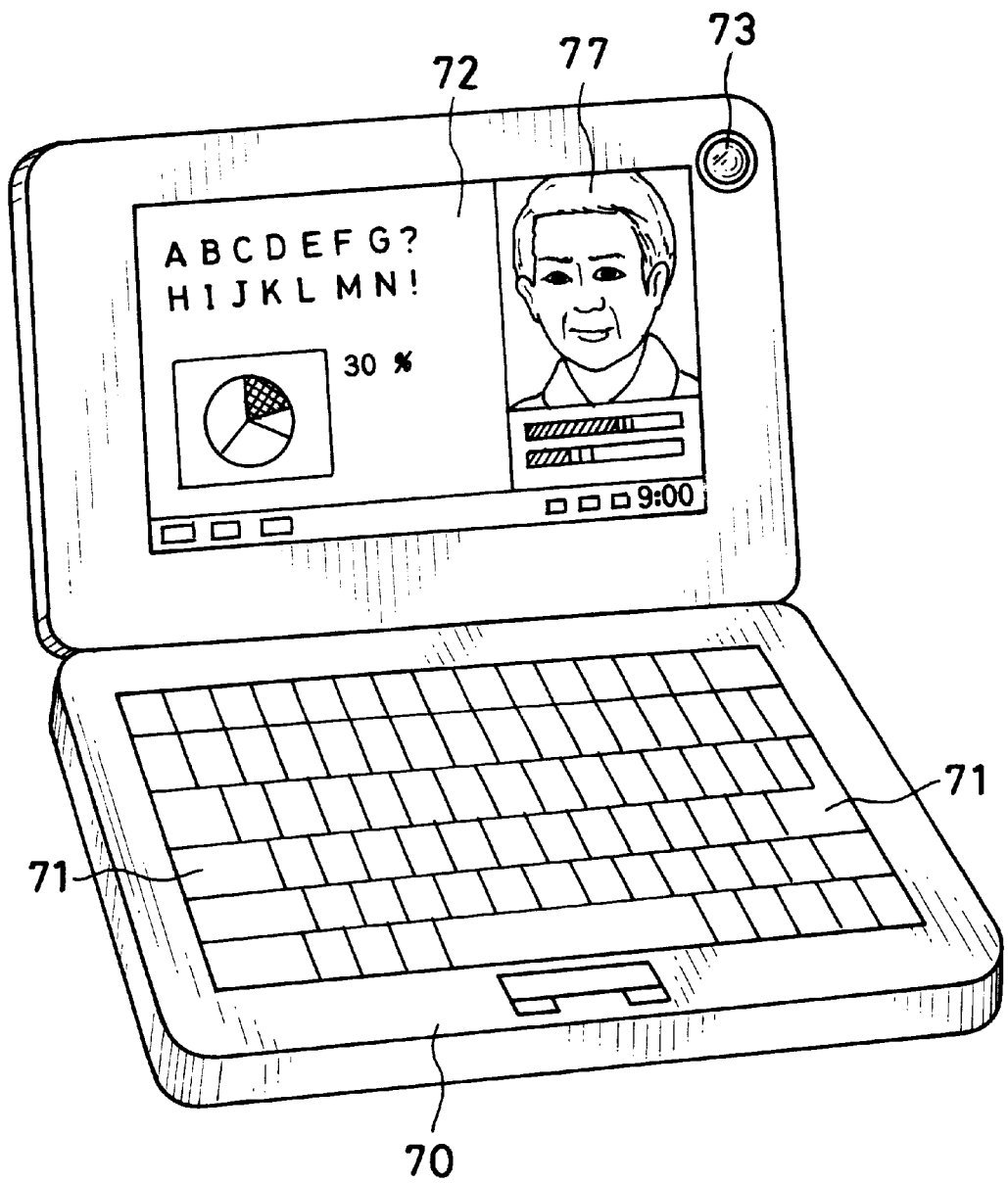
FIG. 11 is a perspective view showing a personal computer incorporating a prism optical system according to the present invention as an objective optical system, as viewed from the front side thereof, in a state where a cover is open.

Next, a personal computer as an example of an information processing apparatus incorporating a prism optical system according to the present invention will be described with reference to FIGS. 11 to 13.

Of these figures: FIG. 11 is a perspective view of a personal computer 70 as seen from the front side thereof in a state where a cover thereof is open; FIG. 12 is a sectional view of a photographic optical system 73 of the personal computer 70; and FIG. 13 is a side view of the personal computer 70 shown in FIG. 11.

As shown in these figures, the personal computer 70 has a keyboard 71 used by an operator to input information externally, and information processing and recording devices (not shown). The personal computer 70 further has a monitor 72 for displaying information for the operator, and a photographic optical system 73 for taking a photograph of the operator or an image of a surrounding object. In this case, the monitor 72 may be a transmissive liquid crystal display, which is illuminated from the rear side by a backlight (not shown), or a reflective liquid crystal display, which displays information by reflecting light applied from the front side thereof. The monitor 72 may also be a CRT display or the like. Although the photographic optical system 73 is incorporated in a portion at the top right corner of the monitor 72, the position of the photographic optical system 73 is not necessarily limited to the illustrated position. The photographic optical system 73 may be provided at any position around the monitor 72 or around the keyboard 71.

The photographic optical system 73 used in the personal computer 70 has, in a photographic optical path 72, a cover glass 54 of negative power, a prism optical system 74 according to the present invention, and an image pickup chip 75 for receiving an object image. These constituent elements of the photographic optical system 73 are incorporated in the personal computer 70.

Figure 12:
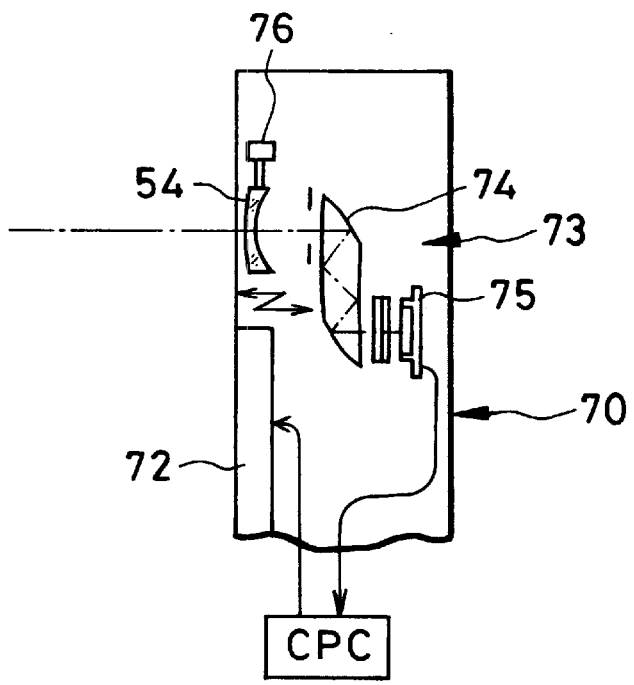
FIG. 12 is a sectional view of a photographic optical system of the personal computer shown in FIG. 11.
Figure 13:
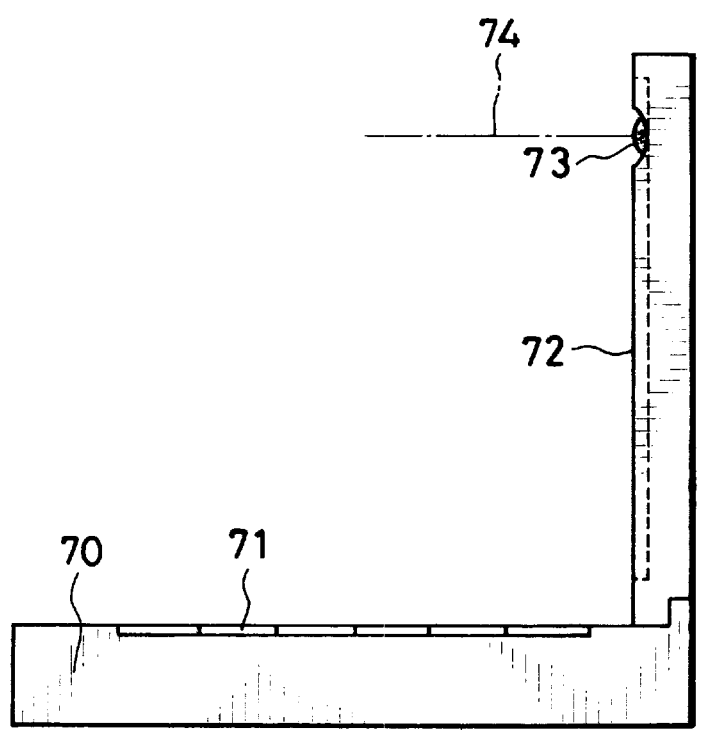
FIG. 13 is a side view of the personal computer in the state in FIG. 11.

As shown in FIG. 12, focusing of the photographic optical system 73 incorporated in the personal computer 70 is effected by moving the cover glass 54 of negative power in the optical axis direction with a driving motor 76.

An object image received by the image pickup chip 75 is input to a processing device (CPU) of the personal computer 70 and displayed on the monitor 72 in the form of an erect electronic image. FIG. 11 shows a photographed image 77 of the operator as an example of the electronic image. The image 77 can also be transferred so as to be displayed on a personal computer of the person on the other end of a communication line from a remote place through the processing device via the internet or telephone lines.

Figure 14:
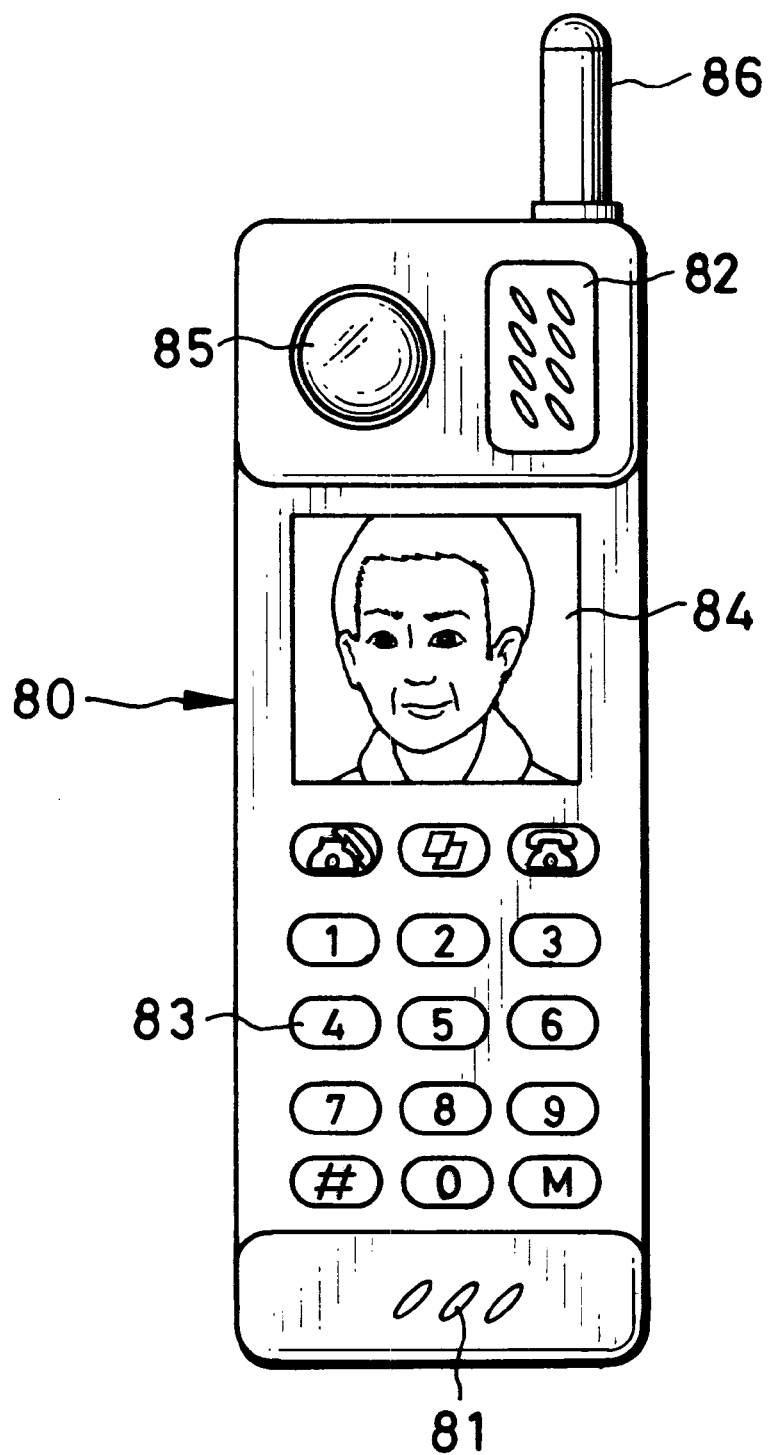
FIG. 14 is a front view of a portable telephone incorporating a prism optical system according to the present invention as an objective optical system.
Figure 15:
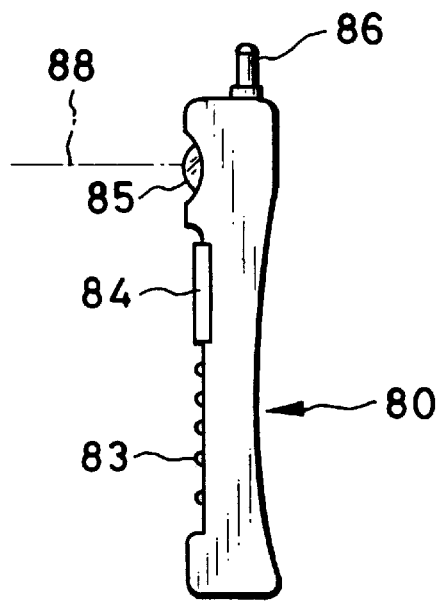
FIG. 15 is a side view of the portable telephone shown in FIG. 14.
Figure 16:
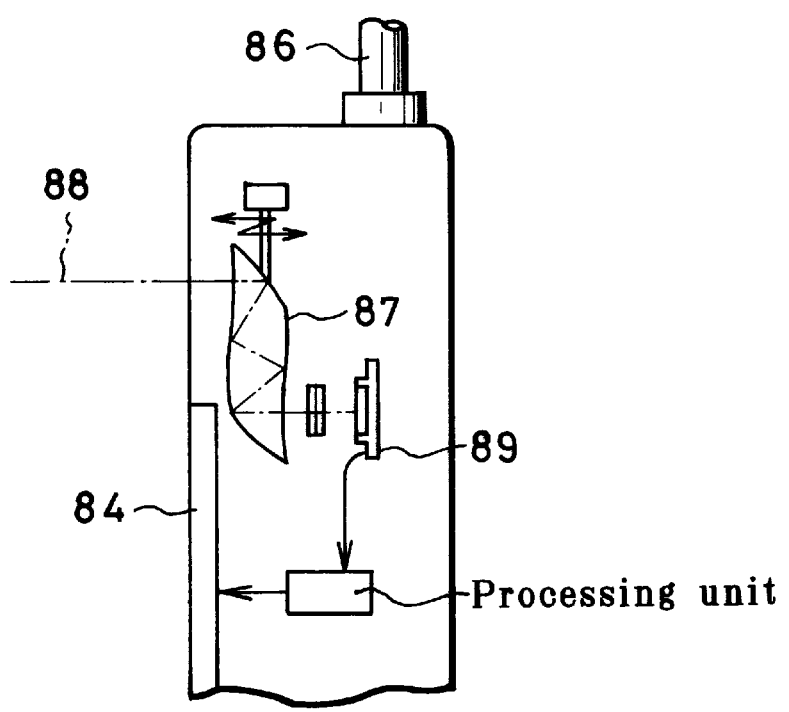
FIG. 16 is a sectional view of a photographic optical system of the portable telephone shown in FIG. 14.

Next, FIGS. 14 to 16 show a telephone as an example of information processing apparatus incorporating a prism optical system according to the present invention, particularly a portable telephone, which is handy to carry.

FIG. 14 is a front view of a portable telephone 80, and FIG. 15 is a side view thereof. FIG. 16 is a sectional view of a prism optical system used in the portable telephone 80.

As shown in FIGS. 14 to 16, the portable telephone 80 has a microphone unit 81 for inputting the voice of the operator as information and a speaker unit 82 for outputting the voice of the person on the other end of a communication line. The portable telephone 80 further has input keys 83 used by the operator to input information, and a monitor 84, e.g. a liquid crystal display, for displaying information, e.g. a photographed image of the operator or the person on the other end of the line, and a telephone number. In addition, the portable telephone 80 has a photographic optical system 85, an antenna 86 for transmitting and receiving electric waves for telephonic communication, and a processing unit for processing image information, communication information, input signals, etc. It should be noted that the layout of the constituent elements shown in the figures is merely an example. The present invention is not necessarily limited to the illustrated layout.

The photographic optical system 85 incorporated in the portable telephone 80 has an objective lens 87 comprising a prism optical system according to the present invention, and an image pickup chip 89 for receiving an object image. The objective lens 87 and the image pickup chip 89 are placed in an optical path 88 for photography. Focusing of the photographic optical system 85 is effected by moving the entire prism along the optical axis.

In the photographic optical system 85, an object image received by the image pickup chip 89 is erected in the processing unit and displayed in the form of an electronic image on the monitor 84 or on the monitor of a person on the other end of a communication line. Alternatively, the object image is displayed on both the monitors. The processing unit further includes a signal processing function to covert information concerning the object image received by the image pickup chip 89 into a transmittable signal when the image is to be transmitted to a person on the other end of a communication line.

As will be clear from the foregoing description, it is possible according to the present invention to provide a compact and high-performance prism optical system favorably corrected for aberrations due to decentration by appropriately using rotationally asymmetric surfaces.

What we claim is:

1. A prism optical system comprising, in order in which light rays pass from an object side thereof:

a first transmitting surface a first reflecting surface;

a second reflecting surface;

a third reflecting surface;

a fourth reflecting surface; and a second transmitting surface;

said first transmitting surface and said second reflecting surface being an identical surface;

said second transmitting surface and said third reflecting surface being an identical surface;

said first reflecting surface and said fourth reflecting surface being independent of said first transmitting surface and said second transmitting surface;

wherein at least one of said first, second, third and fourth reflecting surfaces is a rotationally asymmetric surface, and light rays from an object form an image only after passing through said second transmitting surface without forming an intermediate image in the prism.

2. A prism optical system according to claim 1, wherein at least one of said second reflecting surface and said third reflecting surface has a power.

3. A prism optical system comprising, in order in which light rays pass from an object side thereof:

a first transmitting surface;

a first reflecting surface;

a second reflecting surface;

a third reflecting surface;

a fourth reflecting surface; and a second transmitting surface;

said first transmitting surface and said second reflecting surface being an identical surface;

said second transmitting surface and said third reflecting surface being an identical surface;

said first reflecting surface and said fourth reflecting surface being independent of said first transmitting surface and said second transmitting surface;

wherein at least one of said first, second, third and fourth reflecting surfaces is a rotationally asymmetric surface, and light rays from an object lead a virtual image to a position of an observer's eyeball only after passing through said second transmitting surface without forming an intermediate image in the prism.

4. A prism optical system according to claim 3, wherein at least one of said second reflecting surface and said third reflecting surface has a power.

5. A prism optical system according to claim 2 or 4, wherein at least one of said second reflecting surface and said third reflecting surface is a rotationally asymmetric surface.

6. A prism optical system according to claims 2 or 4, wherein decentration aberrations are corrected by at least one of said second reflecting surface and said third reflecting surface.

7. A prism optical system comprising, in order in which light rays pass from an object side thereof:
a first transmitting surface a first reflecting surface;
a second reflecting surface;
a third reflecting surface a fourth reflecting surface; and
a second transmitting surface; said first transmitting surface and said second reflecting surface being an identical surface;
said second transmitting surface and said third reflecting surface being an identical surface;
said first reflecting surface and said fourth reflecting surface being independent of said first transmitting surface and said second transmitting surface;
wherein at least one of said first, second, third and fourth reflecting surfaces is a rotationally asymmetric surface, and at least one of said second reflecting surface and said third reflecting surface has a power;
wherein when a decentration direction of said prism optical system is a Y-axis direction, and a plane parallel to an axial principal ray is a YZ-plane, and further a direction perpendicularly intersecting the YZ-plane is an X-axis direction, at least one of said second reflecting surface and said third reflecting surface has a surface configuration that changes from a positive to a negative within an optically effective surface area thereof in at least either one of the X-axis direction and the Y-axis direction.

8. A prism optical system according to claim 7, wherein a rotationally asymmetric surface that changes from a positive to a negative satisfies the following condition:

$$0.01<|(CY_{pos}-CY_{neg})/P_Y|<10 \qquad (1)$$

where $CY_{pos}$ is a positive maximum curvature in the Y-axis direction within said effective surface area; $CY_{neg}$ is a negative maximum curvature in the Y-axis direction within said effective surface area; and $P_Y$ is a power in the Y-axis direction of said prism optical system.

9. A prism optical system according to claim 7, wherein a rotationally asymmetric surface that changes from a positive to a negative satisfies the following condition:

$$0.05<|(CY_{pos}-CY_{neg})/P_Y|<3 \qquad (2)$$

where $CY_{pos}$ is a positive maximum curvature in the Y-axis direction within said effective surface area; $CY_{neg}$ is a negative maximum curvature in the Y-axis direction within said effective surface area; and $P_Y$ is a power in the Y-axis direction of said prism optical system.

10. A prism optical system according to claim 7, wherein a rotationally asymmetric surface that changes from a positive to a negative satisfies the following condition:

$$0.01<|(CX_{pos}-CX_{neg})/P_X|<10 \qquad (3)$$

where $CX_{pos}$ is a positive maximum curvature in the X-axis direction within said effective surface area; $CX_{neg}$ is a negative maximum curvature in the X-axis direction within said effective surface area; and $P_X$ is a power in the X-axis direction of said prism optical system.

11. A prism optical system according to claim 7, wherein a rotationally asymmetric surface that changes from a positive to a negative satisfies the following condition:

$$0.05<|(CX_{pos}-CX_{neg})/P_X|<3 \qquad (4)$$

where $CX_{pos}$ is a positive maximum curvature in the X-axis direction within said effective surface area; $CX_{neg}$ is a negative maximum curvature in the X-axis direction within said effective surface area; and $P_X$ is a power in the X-axis direction of said prism optical system.

12. A prism optical system comprising, in order in which light rays pass from an object side thereof:
a first transmitting surface a first reflecting surface;
a second reflecting surface;
a third reflecting surface a fourth reflecting surface; and
a second transmitting surface; said first transmitting surface and said second reflecting surface being an identical surface;
said second transmitting surface and said third reflecting surface being an identical surface;
said first reflecting surface and said fourth reflecting surface being independent of said first transmitting surface and said second transmitting surface;
wherein at least one of said first, second, third and fourth reflecting surfaces is a rotationally asymmetric surface, and at least one of said second reflecting surface and said third reflecting surface has a power;
wherein both said second reflecting surface and said third reflecting surface are rotationally asymmetric surfaces.

13. A prism optical system according to claim 12, wherein both said second reflecting surface and said third reflecting surface have a surface configuration that changes from a positive to a negative within an optically effective surface area thereof in at least either one of an X-axis direction and a Y-axis direction.

14. A prism optical system according to claim 12, wherein said second reflecting surface and said third reflecting surface have powers of different signs.

15. A prism optical system according to claim 14, wherein when a decentration direction of said prism optical system is a Y-axis direction, and a plane parallel to an axial principal ray is a YZ-plane, and further a direction perpendicularly intersecting the YZ-plane is an X-axis direction, said second reflecting surface and said third reflecting surface satisfy the following condition:

$$0.01<|(CY_2-CY_3)/P_Y|<5 \qquad (5)$$

where $CY_2$ is a curvature at a maximum power in the Y-axis direction within an effective surface area of said second reflecting surface; $CY_3$ is a curvature at a maximum power in the Y-axis direction within an effective surface area of said third reflecting surface; and $P_Y$ is a power in the Y-axis direction of said prism optical system; wherein $CY_2 \cdot CY_3 < 0$.

16. A prism optical system according to claim 14, wherein when a decentration direction of said prism optical system is a Y-axis direction, and a plane parallel to an axial principal ray is a YZ-plane, and further a direction perpendicularly intersecting the YZ-plane is an X-axis direction, said second reflecting surface and said third reflecting surface satisfy the following condition:

$$0.05<|(CY_2-CY_3)/P_Y|<2 \qquad (6)$$

where $CY_2$ is a curvature at a maximum power in the Y-axis direction within an effective surface area of said second reflecting surface; $CY_3$ is a curvature at a maximum power in the Y-axis direction within an effective surface area of said third reflecting surface; and $P_Y$ is a power in the Y-axis direction of said prism optical system; wherein $CY_2 \cdot CY_3 < 0$.

17. A prism optical system according to claim 14, wherein when a decentration direction of said prism optical system is a Y-axis direction, and a plane parallel to an axial principal ray is a YZ-plane, and further a direction perpendicularly intersecting the YZ-plane is an X-axis direction, said second reflecting surface and said third reflecting surface satisfy the following condition:

$$0.01 < |(CX_2 - CX_3)/P_X| < 5 \tag{7}$$

where $CX_2$ is a curvature at a maximum power in the X-axis direction within an effective surface area of said second reflecting surface; $CX_3$ is a curvature at a maximum power in the X-axis direction within an effective surface area of said third reflecting surface; and $P_X$ is a power in the X-axis direction of said prism optical system; wherein $CX_2 \cdot CX_3 < 0$.

18. A prism optical system according to claim 14, wherein when a decentration direction of said prism optical system is a Y-axis direction, and a plane parallel to an axial principal ray is a YZ-plane, and further a direction perpendicularly intersecting the YZ-plane is an X-axis direction, said second reflecting surface and said third reflecting surface satisfy the following condition:

$$0.05 < |(CX_2 - CX_3)/P_X| < 2 \tag{8}$$

where $CX_2$ is a curvature at a maximum power in the X-axis direction within an effective surface area of said second reflecting surface; $CX_3$ is a curvature at a maximum power in the X-axis direction within an effective surface area of said third reflecting surface; and $P_X$ is a power in the X-axis direction of said prism optical system; wherein $CX_2 \cdot CX_3 < 0$.

19. A prism optical system comprising, in order in which light rays pass from an object side thereof:
   a first transmitting surface a first reflecting surface;
   a second reflecting surface;
   a third reflecting surface a fourth reflecting surface; and
   a second transmitting surface; said first transmitting surface and said second reflecting surface being an identical surface;
   said second transmitting surface and said third reflecting surface being an identical surface;
   said first reflecting surface and said fourth reflecting surface being independent of said first transmitting surface and said second transmitting surface;
   wherein at least one of said first, second, third and fourth reflecting surfaces is a rotationally asymmetric surface, and at least one of said second reflecting surface and said third reflecting surface has a power;
   wherein at least one of said second reflecting surface and said third reflecting surface is a rotationally asymmetric surface.

20. A prism optical system according to claim 19, wherein a reflection angle at said first reflecting surface satisfies the following condition:

$$10° < |\phi_1| < 45° \tag{9}$$

where $\phi_1$ is the reflection angle at said first reflecting surface for an axial principal ray.

21. A prism optical system according to claim 19, wherein a reflection angle at said first reflecting surface satisfies the following condition:

$$15° < |\phi_1| < 35° \tag{10}$$

where $\phi_1$ is the reflection angle at said first reflecting surface for an axial principal ray.

22. A prism optical system according to claim 19, wherein a reflection angle at said fourth reflecting surface satisfies the following condition:

$$10° < |\phi_4| < 45° \tag{11}$$

where $\phi_4$ is the reflection angle at said fourth reflecting surface for an axial principal ray.

23. A prism optical system according to claim 19, wherein a reflection angle at said fourth reflecting surface satisfies the following condition:

$$15° < |\phi_4| < 35° \tag{12}$$

where $\phi_4$ is the reflection angle at said fourth reflecting surface for an axial principal ray.

24. A prism optical system according to claim 19, wherein when a decentration direction of said prism optical system is a Y-axis direction, and a plane parallel to an axial principal ray is a YZ-plane, and further a direction perpendicularly intersecting the YZ-plane is an X-axis direction, said first reflecting surface satisfies the following condition:

$$0.01 < |CY_1/P_Y| < 2 \tag{13}$$

where $CY_1$ is a curvature at a maximum power in the Y-axis direction within an effective surface area of said first reflecting surface, and PY is a power in the Y-axis direction of said prism optical system.

25. A prism optical system according to claim 19, wherein when a decentration direction of said prism optical system is a Y-axis direction, and a plane parallel to an axial principal ray is a YZ-plane, and further a direction perpendicularly intersecting the YZ-plane is an X-axis direction, said first reflecting surface satisfies the following condition:

$$0.1 < |CY_1/P_Y| < 0.8 \tag{14}$$

where $CY_1$ is a curvature at a maximum power in the Y-axis direction within an effective surface area of said first reflecting surface, and $P_Y$ is a power in the Y-axis direction of said prism optical system.

26. A prism optical system according to claim 19, wherein when a decentration direction of said prism optical system is a Y-axis direction, and a plane parallel to an axial principal ray is a YZ-plane, and further a direction perpendicularly intersecting the YZ-plane is an X-axis direction, said first reflecting surface satisfies the following condition:

$$0.01 < |CX_1/P_X| < 2 \tag{15}$$

where $CX_1$ is a curvature at a maximum power in the X-axis direction within an effective surface area of said first reflecting surface, and $P_X$ is a power in the X-axis direction of said prism optical system.

27. A prism optical system according to claim 19, wherein when a decentration direction of said prism optical system is a Y-axis direction, and a plane parallel to an axial principal ray is a YZ-plane, and further a direction perpendicularly intersecting the YZ-plane is an X-axis direction, said first reflecting surface satisfies the following condition:

$$0.1 < |CX_1/P_X| < 1 \tag{16}$$

where $CX_1$ is a curvature at a maximum power in the X-axis direction within an effective surface area of said first reflecting surface, and $P_X$ is a power in the X-axis direction of said prism optical system.

28. A prism optical system according to claim 19, wherein when a decentration direction of said prism optical system is a Y-axis direction, and a plane parallel to an axial principal ray is a YZ-plane, and further a direction perpendicularly intersecting the YZ-plane is an X-axis direction, said fourth reflecting surface satisfies the following condition:

$$0.01 < |CY_4/P_Y| < 2 \tag{17}$$

where $CY_4$ is a curvature at a maximum power in the Y-axis direction within an effective surface area of said fourth reflecting surface, and $P_Y$ is a power in the Y-axis direction of said prism optical system.

29. A prism optical system according to claims 19, wherein when a decentration direction of said prism optical system is a Y-axis direction, and a plane parallel to an axial principal ray is a YZ-plane, and further a direction perpendicularly intersecting the YZ-plane is an X-axis direction, said fourth reflecting surface satisfies the following condition:

$$0.1 < |CY_4/P_Y| < 0.8 \tag{18}$$

where $CY_4$ is a curvature at a maximum power in the Y-axis direction within an effective surface area of said fourth reflecting surface, and $P_Y$ is a power in the Y-axis direction of said prism optical system.

30. A prism optical system according to claim 19, wherein when a decentration direction of said prism optical system is a Y-axis direction, and a plane parallel to an axial principal ray is a YZ-plane, and further a direction perpendicularly intersecting the YZ-plane is an X-axis direction, said fourth reflecting surface satisfies the following condition:

$$0.1 < |CX_4/P_X| < 2 \tag{19}$$

where $CX_4$ is a curvature at a maximum power in the X-axis direction within an effective surface area of said fourth reflecting surface, and $P_X$ is a power in the X-axis direction of said prism optical system.

31. A prism optical system according to claim 19, wherein when a decentration direction of said prism optical system is a Y-axis direction, and a plane parallel to an axial principal ray is a YZ-plane, and further a direction perpendicularly intersecting the YZ-plane is an X-axis direction, said fourth reflecting surface satisfies the following condition:

$$0.1 < |CX_4/P_X| < 1 \tag{20}$$

where $CX_4$ is a curvature at a maximum power in the X-axis direction within an effective surface area of said fourth reflecting surface, and $P_X$ is a power in the X-axis direction of said prism optical system.

32. A prism optical system according to claim 19, wherein both said first reflecting surface and said fourth reflecting surface are rotationally asymmetric surfaces having powers of a same sign.

33. A prism optical system according to claim 19, wherein both said first reflecting surface and said fourth reflecting surface are rotationally asymmetric surfaces having positive powers.

34. A prism optical system according to claim 19, wherein an axial principal ray entering said prism optical system and an axial principal ray exiting therefrom satisfy the following condition:

$$0° \leq \theta < 45° \tag{21}$$

where $\theta$ is an angle formed between the axial principal ray entering said prism optical system and the axial principal ray exiting therefrom.

35. A prism optical system according to claim 19, wherein an axial principal ray entering said prism optical system and an axial principal ray exiting therefrom satisfy the following condition:

$$0° \leq \theta < 20° \tag{22}$$

where $\theta$ is an angle formed between the axial principal ray entering said prism optical system and the axial principal ray exiting therefrom.

36. A prism optical system comprising, in order in which light rays pass from an object side thereof:
   a first transmitting surface a first reflecting surface;
   a second reflecting surface;
   a third reflecting surface a fourth reflecting surface; and
   a second transmitting surface; said first transmitting surface and said second reflecting surface being an identical surface;
   said second transmitting surface and said third reflecting surface being an identical surface;
   said first reflecting surface and said fourth reflecting surface being independent of said first transmitting surface and said second transmitting surface;
   wherein at least one of said first, second, third and fourth reflecting surfaces is a rotationally asymmetric surface, and at least one of said second reflecting surface and said third reflecting surface has a power;
   wherein decentration aberrations are corrected by at least one of said second reflecting surface and said third reflecting surface.

37. An image pickup apparatus comprising:
   a photographic optical system having an optical path for photography; and
   a finder optical system having an optical path for a finder;
   wherein said prism optical system according to any one of claims 2, 3, 7, 12, 38, or 39 is incorporated in said finder optical system.

38. An image pickup apparatus comprising:
   an image-forming optical system for forming an object image;
   an image pickup device for receiving said object image and converting it into an electric signal;
   a processing unit for converting said electric signal into an image signal; and
   a display unit for displaying an image on a basis of said image signal;
   wherein said prism optical system according to any one of claims 2, 3, 7, 12, 38, or 39 is incorporated as said image-forming optical system.

* * * * *